US012662361B2

(12) United States Patent
Bowden et al.

(10) Patent No.: US 12,662,361 B2
(45) Date of Patent: Jun. 23, 2026

(54) CRUSH AVOIDANCE DEVICE

(71) Applicant: EQUIPMENT SAFETY SYSTEMS PTY LTD, Cranbourne (AU)

(72) Inventors: Ross Bowden, Cranbourne (AU); Kieren Grogan, Cranbourne (AU)

(73) Assignee: Equipment Safety System PTY LTD, Keysborough (AU)

( * ) Notice: Subject to any disclaimer, the term of this patent is extended or adjusted under 35 U.S.C. 154(b) by 1066 days.

(21) Appl. No.: 17/635,252

(22) PCT Filed: Aug. 17, 2020

(86) PCT No.: PCT/AU2020/000082
§ 371 (c)(1),
(2) Date: Feb. 14, 2022

(87) PCT Pub. No.: WO2021/026585
PCT Pub. Date: Feb. 18, 2021

(65) Prior Publication Data

US 2022/0289545 A1 Sep. 15, 2022

(30) Foreign Application Priority Data

Aug. 15, 2019 (AU) ................................ 2019902969
Feb. 21, 2020 (AU) ................................ 2020900500

(51) Int. Cl.
*B66F 17/00* (2006.01)
*B66F 11/04* (2006.01)

(52) U.S. Cl.
CPC .......... *B66F 17/006* (2013.01); *B66F 11/042* (2013.01)

(58) Field of Classification Search
CPC ...... B66F 17/006; B66F 11/042; G01S 15/58; G01S 17/06; G01S 17/58; G01S 17/931; G01S 17/88; G06V 40/10
See application file for complete search history.

(56) References Cited

U.S. PATENT DOCUMENTS 9,679,461 B2 * 6/2017 Cummings ........... B66F 17/006
11,472,685 B1 * 10/2022 Thompson ............ B66F 11/044
(Continued)

FOREIGN PATENT DOCUMENTS

GB 2530780 A * 4/2016 ............ B66F 11/042
WO 2020061322 A1 3/2020

OTHER PUBLICATIONS

EPO Communication, Extended Search Report, EP 20852238.3 Equipment Safety System Pty Ltd, European Patent Office, mail date Sep. 6, 2023, 8 pgs.
(Continued)

*Primary Examiner* — Gary C Hoge
(74) *Attorney, Agent, or Firm* — Patent Law Works LLP

(57) ABSTRACT

A crush avoidance device 100,200,300 (n00) for attachment to an elevated work platform (EWP) 10. The EWP 10 includes a machine control system (MCS) 20 adapted to be operated by an operator to be located on an operator support 50 comprising an operator cage 52. The positioning and movement of the operator support 50 is operable to be controlled by the MCS 20 on or in the support 50. The EWP 10 also includes a drive mechanism 62,72 adapted to effect movement of the support 50 by alternatively engaging a base vehicle drive 72 for land-based movement of the EWP 10 and a height adjustment ram 62 for elevating or lowering the support 50. The MCS 20 is adapted to immediately enact a safety response on receiving a signal from a crush avoidance device (CAD) n00. The crush avoidance device n00 includes a motion detector 120,220,320 that is adapted to detect the operator's movement in or on the support 50 without physical contact with the operator. On detecting a movement of the operator that is associated with a crush event, the crush avoidance device 100,200 is adapted to actuate the safety response.

19 Claims, 16 Drawing Sheets

(56) References Cited

U.S. PATENT DOCUMENTS

| | | | | |
|---|---|---|---|---|
| 2016/0075543 | A1* | 3/2016 | Lombardo | B66F 11/044 187/247 |
| 2019/0119090 | A1* | 4/2019 | Maisonnette | B66F 11/042 |
| 2019/0177140 | A1 | 6/2019 | Gilbride et al. | |
| 2019/0210854 | A1* | 7/2019 | Eck | B66F 17/006 |
| 2020/0408875 | A1* | 12/2020 | Mai | G01S 7/006 |

OTHER PUBLICATIONS

PCT International Search Report and Written Opinion; Application No. PCT/AU2020/000082 Equipment Safety Systems Pty Ltd., International filing date of Aug. 17, 2020, date of mailing Nov. 24, 2020, 15 pages.

PCT International Preliminary Report on Patentability with Article 34 Amendments; Application No. PCT/AU2020/000082 Equipment Safety Systems Pty Ltd., International filing date of Aug. 17, 2020, date of mailing Jul. 8, 2021, 9 pages.

* cited by examiner

CRUSH AVOIDANCE DEVICE

FIELD OF INVENTION

This invention relates to a crush avoidance device. More particularly, this invention relates to a crush avoidance device for an elevated work platform (EWP) operator.

BACKGROUND ART

The following references to and descriptions of prior proposals or products are not intended to be, and are not to be construed as, statements or admissions of common general knowledge in the art. In particular, the following prior art discussion should not be assumed to relate to what is commonly or well known by the person skilled in the art, but to assist in the inventive process undertaken by the inventor(s) and in the understanding of the invention.

Elevated work platforms (EWP) provide a useful elevated work space for workers and can address many problems associated with the use of scaffolding and ladders in certain situations where the ground surface is suitable and the reach required is within the limits of the EWP. However, one particularly distressing and dangerous problem has emerged in the use of EWPs, relating to the potential for crush injuries and sheering injuries to the operator in the crow's nest. This hazard may be associated with compliance issues and failure to adhere to recommended procedure. It can occur particularly when an operator attempts to negotiate a low-lying clearance (such as a door opening) whilst moving the vehicle, reverses and/or raises the platform into the path of a fixed object or structure. An operator may be forced forward onto the console, pinned with the growing force and may sustain crush injuries. A crow's nest cage is normally fitted with a dead-man's kill switch at the operator's foot position which the operator must stand on to complete the EWP's circuit to operate the EWP. However, such a safety feature is, alone, in the inventor's experience inadequate to protect the EWP operator against the hazard of crush injuries as the operator may continue to inadvertently apply pressure to the kill switch in a crush position.

Crush guards have been used for EWPs. They may include a solid bar extending across an operator's chest when in a standing position. The solid bar may rotate to engage sensors or to complete a circuit connected to a kill switch. However, such rigid structures themselves can present a crush hazard forward of the operator. Alternatively, a touch-sensitive surface or pressure pad has been used on the front edge of the EWP's control console facing the operator. However, such an arrangement is prone to false triggers and will only prevent specific incidents. The operator may have a tendency to inadvertently activate the trigger by accidental touching of the pressure pad or touch surface. Compliance can therefore be an issue.

An object of the present invention is to ameliorate one or more of the aforementioned disadvantages of the prior art or to at least provide a useful alternative thereto.

STATEMENT OF INVENTION

The invention according to one or more aspects may be as defined in the independent claims. Some optional and/or preferred features of the invention are defined in the dependent claims.

Accordingly, in one aspect of the invention there is provided:

A crush avoidance device for attachment to an elevated work platform (EWP), the EWP including:

(a) a machine control system (MCS) adapted to be operated by an operator, (b) an operator support, the position of which is adapted to be controlled by the MCS on or in the support; and (c) a drive mechanism adapted to effect movement of the support and to immediately react to a safety response, wherein the crush avoidance device:

(i) includes a motion detector that is adapted to detect the operator's movement in or on the support without physical contact with the operator; and (ii) on detecting a movement of the operator that is associated with a crush event, the crush avoidance device is adapted to enact the safety response.

Elevated Work Platform

An EWP may be a vehicle or a lifting device mounted to a vehicle, such as a trailer, or another portable base. The drive mechanism may include a lifting mechanism for the support. The EWP may be a cherry picker or boom lift. The lifting mechanism may be a scissor lift mechanism or an articulated boom.

Support

The support may be a work platform. The support may be a portable, movable, and/or elevatable crow's nest. The support may comprise a cage or basket.

Machine Control System

The MCS may include a computer processor. The MCS may include a manual control device.

The MCS may form part of an operator control box or console. The console may be installed or mounted on or in the support. The manual control device may include a joystick or a hand-lever that may be toggled between alternative vertical and/or lateral vehicle or support movements.

The manual control device may be detachable and remotely operable by the operator.

The MCS may include ports and hardware adapted to receive and communicate with additional custom devices such as a global system for mobile (GSM) communications device.

Safety Response

In the specification, the term "immediately" means within 500 milliseconds (ms), more preferably 200 ms and most preferably 100 ms. The safety response may involve immediately redirecting the movement of the drive mechanism or the movement of the supporting vehicle, trailer or base. Preferably, the safety response comprises a kill switch. The kill switch may be adapted to immediately stop the operation of the drive mechanism. Preferably the actuation of the kill switch is adapted to fix the support in place, preferably before the crush event occurs.

The kill switch may be adapted, on actuation, to immediately halt both the operation of the drive mechanism and the motion of the vehicle, applying brakes if applicable. The kill switch may be an electronic circuit breaker that electronically stops the operation of the drive mechanism to freeze movement of the support and stop land-based movement of the vehicle or other portable base on which the EWP is mounted.

Crush Avoidance Device

The crush avoidance device may be adapted to be installed during manufacture of the EWP. The crush avoidance device may be adapted to be installed post-manufacture of the EWP, for example as an after-sales service, aftermarket installation or retrofit.

The crush avoidance device may be adapted to be hardwired to the MCS, or adapted to be in wireless communication with the MCS. The crush avoidance device may be adapted to be hardwired to the dead man switch (kill switch), or adapted to be in wireless communication with the dead man switch (kill switch).

Advantageously, the crush avoidance device is contained as a module or multiple modules. Preferably, the multiple modules include a sensor module and a processing or control module. The sensor module is preferably connected to the processing or control module. The crush avoidance device and/or modules may include a housing to contain and/or mount component parts forming part of the crush avoidance device. The housings may be mountable to, near to, and/or adjacent to, the support. The housing may be mountable to, near to, and/or adjacent to, the console. The housings for the processor or control module may be mountable to, near to, inside and/or adjacent to, a main operator control box of the MCS.

A combination of predetermined algorithms may be used by a processor of the crush avoidance device such that it is adapted to:

(a) Sense that an operator is present on or in the support; and/or (b) Map the simple dimensions and shape of the support on or within which the operator is intended to be confined during the operation of the EWP; and/or (c) Identify at least one parameter of the operator, such as body shape and/or dimensions; and (d) Detect at least one movement of the operator that is associated with, preparatory to or predictive of, a crush event.

The parameters characterising the operator may simply be based on average size, dimensions and/or weight. The parameter may be adapted to identify one or more key anatomical features of the operator, such as a central chest, chin and/or shoulder point. The characteristic operator parameter may be adapted to track one or more key points of the operator's anatomy, characteristic of certain movements, including movements preparatory or predictive of a crush event. The operator parameter may include body shape and/or dimensions The crush avoidance device may include a battery backup with memory stored logging.

The crush avoidance device may include an enable switch which is configured to turn the crush avoidance device on or off through an "on" and "off" position of the enable switch respectively. The crush avoidance device may be configured such that if the enable switch is held in the "on" position and the kill switch is in an "on" position, the alert device will sound to remind the operator that the kill switch is still on. The alert device may sound 3 times. The "on" position of the kill switch is after the kill switch has been actuated and is stopping operation of the drive mechanism or fixing the support in place. When the crush avoidance device is "on", the crush avoidance device is configured to detect movement of the operator and perform other functions mentioned in this specification. When the crush avoidance device is "off", the crush avoidance device is configured not to detect movement of the operator.

The enable switch may be a button, switch, touchscreen or voice input.

The crush avoidance device may further include an override mode. The override mode may be activated with the enable switch. The override mode may be activated by pressing the enable switch a number of times. Preferably, the override mode is activated by pressing the enable switch sequentially two times and then holding the enable switch down on a third press for a time period. The crush avoidance device may be adapted to turn off the override mode in a first override time period after the override mode is activated. The first override time period may be less than 30 seconds. Preferably, the first override time period is between 10 and 20 seconds. After the override mode has been turned off or expired, the override mode cannot be turned on again for a second override time period. The second override time period may be less than 2 minutes. Preferably, the second override time period is between 30 seconds and 1 minute, 30 seconds. The override mode may temporarily enable movement of the EWP for the first override time period. The override mode may temporarily enable the operator to move the EWP with the MCS for the first override time period after the override mode is activated.

Motion Detector

The motion detector is preferably adapted to detect movement of the operator that is associated with the crush event without physical contact with the operator. The motion detector may be a non-contact motion detector in that it detects motion of the operator without contacting the operator.

The motion detector may be adapted to be mounted or located in or on the housing. The motion detector may be adapted to be mounted or located in or on the console or in close association with the console. Alternatively, the motion detector may be adapted to be mounted or located in or on the support. The motion detector may be adapted to be mounted or located in spaced relationship to the housing. The motion detector may be adapted to be in communication with one or more of the components of the housing. The housing is preferably configured for mounting on the side of an operator control box located at the support console. The housing may be made of metal or plastic or a composite of both. Preferably, the housing is made of a strong, lightweight, weather-resistant and mouldable plastic such as ABS. Preferably, the housing is ultraviolet (UV) light resistant.

The motion detector may be adapted to use visible or non-visible spectrum light transmission and reception, radio signals or microware signals to sense the movement of the operator relative to the support.

The motion detector may include a technology that detects original or reflected electromagnetic waves. The motion detector may be adapted to emit electromagnetic waves and to detect their reflection. The motion detector may be positioned and orientated such that a transmitter and/or receiver of the electromagnetic waves is pointing towards and/or facing the operator. The motion detector may be positioned and orientated such that the transmitter and/or receiver are pointing at an angle of between 20'-40° above horizontal.

The electromagnetic waves may be in the optical or in the non-visible spectrum. The motion detector may include ultrasonic sensors. The ultrasonic sensors may be configured to emit and detect ultrasonic waves. The motion detector may include cameras. The crush avoidance device may be configured to analyse video feed from the cameras to determine the position and movement of the operator.

Preferably the motion detector uses LIDAR (Light Detection and Ranging) technology. LIDAR is a surveying method that measures distance to a target by projecting laser light onto the target and measuring the reflected light with a sensor. LIDAR may be a time of flight distance sensor. LIDAR may be configured to measure time taken for light sent from the motion detector to reflect off a surface (such as the operator) and be detected back in the motion sensor. LIDAR may use a laser to send the light from the motion detector. The laser may be configured to emit light of between 800 nanometres (nm) and 900 nm. Preferably, the laser is configured to emit light of 850 nm. The laser may have a power usage of between 250 milliwatts to 1 Watt. A field of view of the motion detector may be between 2° and 8°. Preferably, the field of view of the motion detector is between 3° and 5°. Accuracy of the motion detector may be +−20 mm, preferably, +−10 mm.

The motion detector may be adapted to obtain data to map the size, dimensions, profile and/or body shape of the operator. The data may be fed to the crush avoidance device processor as variables. The processor may be adapted to calibrate the motion sensor by the application of the data and variables to the combination of predetermined algorithms. The processor may be programmed with or include hardware which includes artificial intelligence algorithms adapted to identify the crush events. The motion detector may be configured to individually measure amplitude and direction of acceleration and velocity and position of parts of the operator and the operators clothing relative to the motion sensor and/or the manual control device. Acceleration includes rotational acceleration, which may require a separate accelerometer. An additional accelerometer may be required to compensate for additional forces generated during any rotational movement of the vehicle.

The algorithms may require variable data input such as acceleration, velocity and vector orientation. The algorithms may also or alternatively require digital and analogue inputs such as position of the machines drive selection and a position and/or orientation of the operator's joystick. The processor may incorporate adaptive technology to refine the algorithms, by operator and real event feedback, to progressively avoid false positives (i.e. false triggering of the kill switch).

LIDAR or other motion detection data may be collected and processed by the device processor or a remote computing service in real-time. Signal processing may determine whether or not the operator is operating within a safe positional envelope (operator safety envelope) and includes "operator absent or non-detectable data" for example when the operator ducks down to avoid an overhead obstacle, such as a doorway. The crush avoidance device is preferably adapted to detect:

a. the operator lurching forward or backward, looking over the side or crouching. Each of these body movements or practices is considered unsafe as they may indicate a possible collision, dangerous positioning of body parts or ducking.

On occurrence of such events, the crush avoidance device preferably generates an alarm and a cutout (activation of the kill switch).

The crush avoidance device may be configured to calibrate the motion detector for different sized and shaped operators within a calibration area. The MCS or main operator control box may include a switch, button and/or touch screen in respect of which is used to monitor and control a "dead man switch". Upon activation of the dead man switch, the crush avoidance device may be configured to take measurements of a position parts of the operator to calibrate the crush avoidance device and adjust to limits of the movement of the operator that may be predicted to be associated with a crush event.

The one or more of the movements of the operator that are associated with a crush event or anticipation thereof may include the following:

Sudden acceleration of the operator's torso toward a side or end of the support;

Operator moves out of the defined normal workspace with respect to the motion detector mounting point;

Operator's acceleration is high; and/or

Operator's position relative to the motion sensor is low.

"High" acceleration of the operator is determined by the acceleration of the operator outside predetermined expected parameters. For example, acceleration of the operator's torso, shoulder and/or head greater than 0.3 m/s/s, more preferably 0.5 m/s/s, and most preferably 0.7 m/s/s may be characteristic of "high" acceleration or a movement of the operator "too suddenly", thereby being indicative of a crush event.

A "low" operator position may correspond to the operator, for example the operator's torso, shoulder and/or head, moving to a position relative to the motion sensor that is lower than a predetermined height parameter, for example, at an altitude or relative position that is less than 150 mm above the motion sensor position.

The one or more of the movements of the operator that are associated with a crush event or anticipation thereof may include the following:

The operator moves out of the calibration area;

The operator moves too suddenly; and/or

The operator moves out of line of sight of the sensor such as when crouching or looking over the railing while ascending.

Depending on the EWP application, the skilled person may determine the parameters for relative terms, such as "too suddenly".

The crush avoidance device may not identify the operator leaning or peering over the support as a crush event or anticipation thereof if the operator is driving. This may be in a situation where the operator is looking over the support to observe wheels of the EWP while driving.

The manual operator control, console, and/or operator control box may be located at the side or end of the support. Anticipation of, or an actual, crush event may be associated with the operator's torso moving forward. This may be associated with a voluntary ducking action, or with the operator being involuntarily forced forward.

The crush avoidance device may further include a support motion detector configured to measure amplitude and direction of acceleration and velocity and position of the support. The support motion detector may include a "nine degrees of freedom inertial motion unit" (9DOF). The 9DOF may include accelerometers, gyroscopes and magnetometers. Preferably, the 9DOF includes 3 accelerometers, 3 gyroscopes and 3 magnetometers. The 9DOF may be configured to measure the amplitude and direction of acceleration and velocity and position of the support. Alternatively or in addition, the direction and velocity of the support may be estimated or determined by the digital inputs of the mode of operation set on the MCS such as forward or backward and the analogue inputs to measure the position and/or orientation of the operator joystick. The mode of operation may be a setting on the MCS that determines which direction the support will move such as forward, backwards, up or down. The mode of operation may be set with the machines drive selection on the MCS. The crush avoidance device may detect inputs (such as the digital inputs and analogue inputs) to controls of the MCS by the operator to estimate or measure amplitude and direction of acceleration, velocity and position of the support. The inputs to the controls may include activating/deactivating switches, buttons and moving joysticks. The controls may include a mode of operation switch and the joystick. Advantageously, the LIDAR may be operable to measure distance in centimetres or inches, with an accuracy of +/−50 mm (2 in.) and have a maximum sensing distance of 5000 mm. The identification of the operator safety envelope may include the following criteria:

1. The operator is no further than 200 mm from where the operator was when the dead man switch was activated by the operator,
2. The velocity of any motion by the operator is lower than a safety threshold. Any greater velocity may indicate an involuntary or unsafe motion by the operator.

The operational voltage of the LIDAR may be within the range of 9 VDC to 36 VDC and have an operational temperature of −10° C. to +70° C., have a humidity range of 10%-90% non-condensing. The crush avoidance device is preferably engineered to withstand vibrations up to 100 g at 50 Hz.

The 9DOF or the digital and analogue inputs may be configured to measure whether the support is moving any direction such as backwards, forwards, left, right, up and down. The processor may be configured to use measurements from the 9DOF or the digital and analogue inputs and the LIDAR to detect a potential crush event. For example, if the support is moving backwards, it is more likely that the operator will be hit on the opposite side to the LIDAR and therefore move towards the LIDAR. Therefore, a characterising movement of the operator associated with a crush event may include the support moving backwards and the operator moving a certain distance and/or acceleration forward.

The device may be adapted to detect vehicle instability, for example on inclined planes where the vehicle is at risk of sliding or rolling over. In the event of a crush event being detected, advantageously the crush avoidance device is adapted to activate the kill switch to work against additional movement of the EWP.

The crush avoidance device may be configured such that to first operate the EWP, the dead man switch must be pressed and therefore the crush avoidance device must be calibrated to the operator. The crush avoidance device may be configured to start detecting movement of the operator after the crush avoidance device has been calibrated.

The crush avoidance device may further include digital and analogue input channels which are adapted to send or transmit the digital and analogue inputs to the processor. The LIDAR, 9DOF, digital and analogue input channels and/or processor may include Wi-Fi communication devices configured for the LIDAR, 9DOF and digital and analogue input channels to communicate with an internal web server in the processor for calibration, diagnostic reporting, configuring and viewing of logs of measurements taken from the LIDAR, 9DOF and digital and analogue input channels. Calibrations and settings of the device may be carried out via a web browser connected over Wi-fi and/or radio transmission/reception. The crush avoidance device may include warning and alarm set points. Data logging events and errors of up to 8000 events may be viewable through an on-board web server viewable through a touch screen on the console/control box.

The motion detector may be a small non-intrusive device. The motion detector may include a maximum width of 300 millimetres (mm). The motion detector may include a maximum width of 70 mm. Width being any of a length, width or thickness of the motion detector.

Alert Device

The crush avoidance device may further include an alert device configured to alert the operator and others of a crush event and/or other events detected by the processor, LIDAR, 9DOF and/or digital and analogue input channels. The other events may include system errors. The alert device may include a speaker and/or a light. The light may be a strobe light. The light may be configured to emit any coloured light. Preferably, the alert device includes a horn and optionally includes a blue strobe light. The crush avoidance device may further include a notification light, such as light emitting diode. The notification light may be adapted to emit multiple colours. The notification light may be a red-green-blue (RGB) light. The notification light may be adapted to notify the operator of when a crush event is detected, when the EWP can be moved and operated and/or whether the dead man switch is pressed or not. The speaker may project voice outputs such as "lift stopped due to crush event detected from rear". The alert device and/or processor may include an audio voice output CODEC. Advantageously, the voice outputs may be adapted to communicate any actions taken by the crush avoidance device to an operator without training in or knowledge of the crush avoidance device. The voice outputs may be configurable to be switched between multiple languages.

Preferably, the alert device projects the following voice outputs:

- The phrase "operator movement" or synonymous phrases indicating that the reason for detecting a crush event is that the operator moved too suddenly or erratically;
- The phrase "operator position" or synonymous phrases indicating that the operator has moved too far from the calibration area or the operator is not within line of sight of the sensor;
- The phrase "elevate" when the EWP is set to move up or down; and
- The phrase "drive" when the EWP is set to move forward or backwards.

Drive Mechanism

The drive mechanism may be adapted to control movement of the support in an up or down motion (in the case of a scissor lift) and positional movement of the support (in the case of a support mounted to an articulated boom). The drive mechanism may be a known drive mechanism, such as a hydraulic ram or combination of rams.

BRIEF DESCRIPTION OF THE DRAWINGS

The invention may be better understood from the following non-limiting description of preferred embodiments, in which.

DETAILED DESCRIPTION OF THE DRAWINGS

Figure 32:
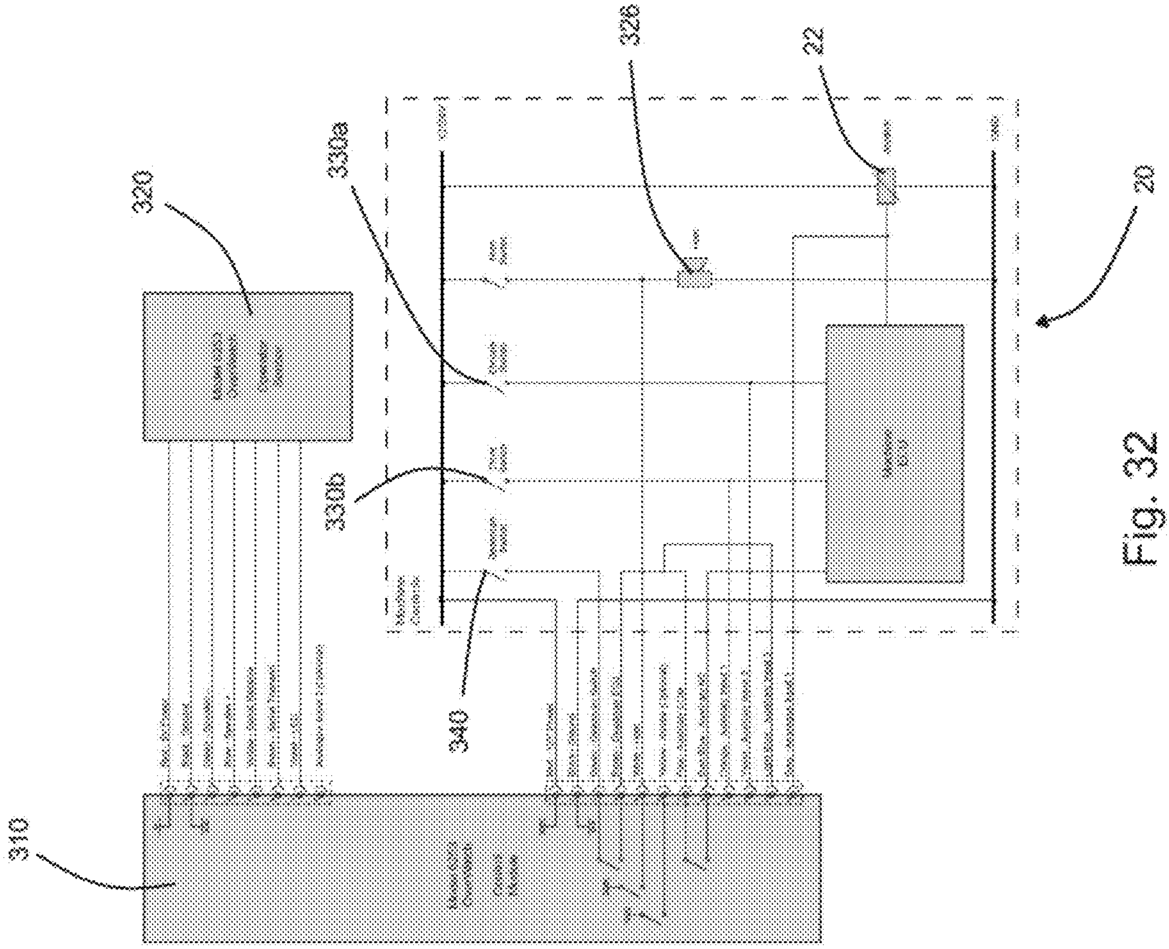
FIG. 32 is a schematic diagram of circuitry of the crush avoidance device according to the third embodiment of the invention.
Figure 1:
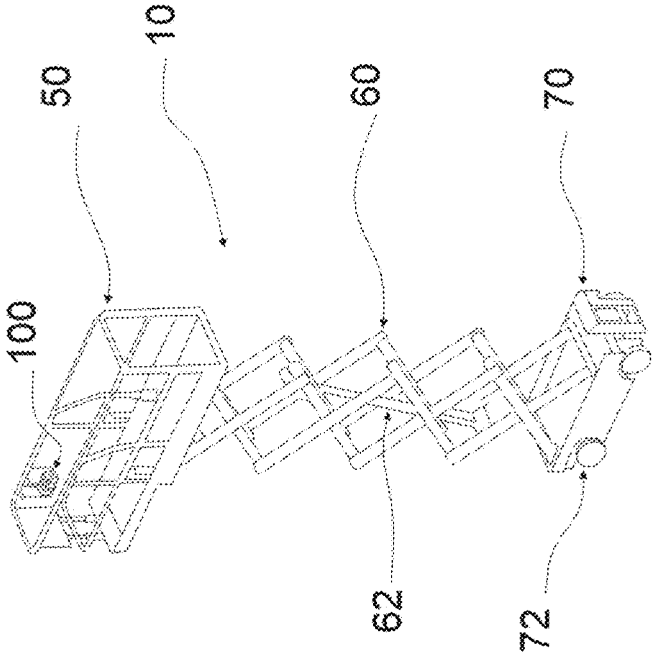
FIG. 1 is a perspective view of a scissor lift incorporating a crush avoidance device according to a first embodiment of the invention.
Figure 2:
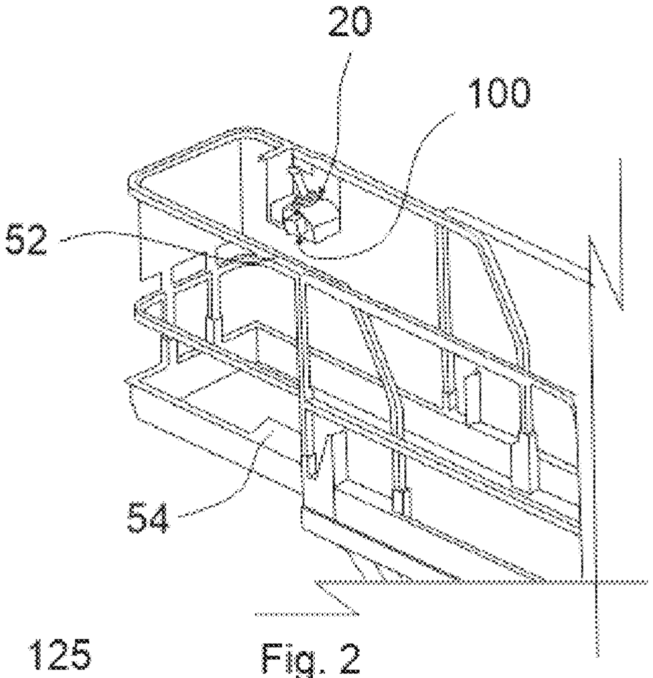
FIG. 2 is a perspective view of a portion of a crow's nest incorporating the crush avoidance device shown in FIG. 1.
Figure 3:
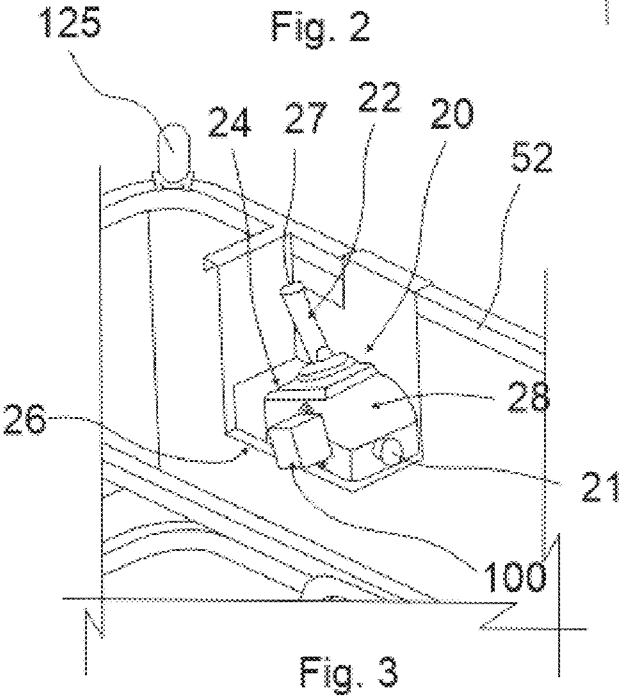
FIG. 3 is a perspective view of a console incorporating the crush avoidance device shown in FIG. 1.
Figure 4A:
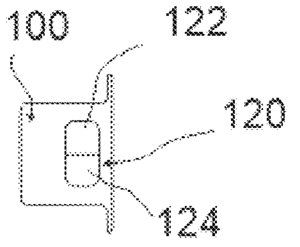
FIGS. 4*a-f* show the crush avoidance device shown in FIG. 1 from (a) right side, (b) underside, (c) front, (d) left side, (e) upper perspective and (f) top plan views, respectively.
Figure 4B:
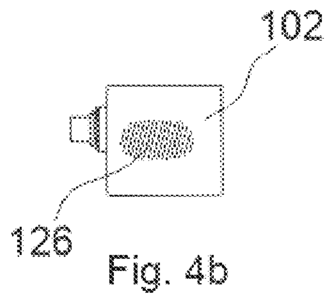
Figure 4C:
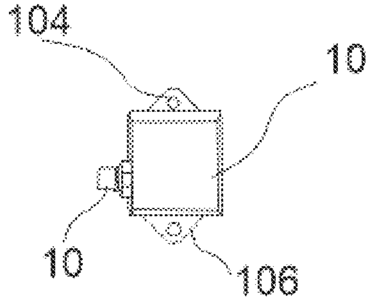
Figure 4D:
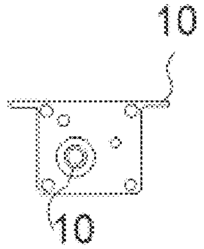
Figure 4E:
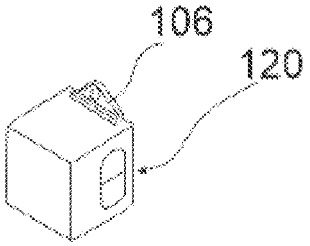
Figure 4F:
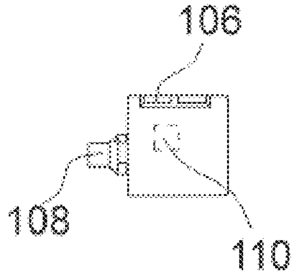

Preferred features of the present invention will now be described with particular reference to the accompanying drawings. However, it is to be understood that the features illustrated in and described with reference to the drawings are not to be construed as limiting on the scope of the invention. In describing the various embodiments of the invention, like features will be referred to using like references, with references for features of each embodiment generally preceded by 1, 2, 3, or followed by a Roman numeric sequence, such as i, ii, iii, etc. or an alphabetical sequence such as a, b, c, relative to the corresponding feature of the first embodiment. For example, a feature 10 of the first embodiment may represented as 110, 210, 310, (or n10), or 10*a*, 10*b*, 10*c*, (or 10*x*) or 101, 10*ii*, 10*iii*, (or 10*r*) etc. in second, third and fourth embodiments, respectively.

Referring to the drawings, there is shown a crush avoidance device 100,200,300 (n00) for attachment to an elevated work platform (EWP) 10. The EWP 10 includes a machine control system (MCS) 20 adapted to be operated by an operator to be located on an operator support 50 comprising an operator cage 52.

The positioning and movement of the operator support 50 is operable to be controlled by the MCS 20 on or in the support 50. The EWP 10 also includes a drive mechanism 62,72 adapted to effect movement of the support 50 by alternatively engaging a base vehicle drive 72 for land-based movement of the EWP 10 and a height adjustment ram 62 for elevating or lowering the support 50. The MCS 20 is adapted to immediately enact a safety response on receiving a signal from a crush avoidance device (CAD) n00.

The CAD 100 according to a first embodiment of the invention is shown in FIGS. 1-6 and 22-31. The CAD 200 according to a second embodiment of the invention is shown in FIGS. 5-31. The CAD according to a third embodiment of the invention is shown in FIGS. 7-21 and 32-34. The second embodiment of the CAD 200 is identical to the first embodiment of the CAD 100 except for the housings 102,202*a*,*b*. The third embodiment of the CAD 300 is identical to the second embodiment of the CAD except for circuitry and a processor 210,310 of the CAD 200,300. The housings 102,

202*a,b* include a housing 102 of the first embodiment of the invention. The housings 102, 202*a,b* further include a motion detector (LIDAR) housing 202*a* and a processor housing 202*b* of the second embodiment of the invention. The housings 202*a-b*,302*a-b* of the second and third embodiment of the CAD are identical. In this specification, features or components with reference numbers between 100-138*b* are features or components of the first embodiment of the CAD 100. Furthermore, in this specification, features or components with reference numbers between 200-238*b* are features or components of the second embodiment of the CAD 200. In this specification, features or components with reference numbers between 300-342 are features or components of the third embodiment of the CAD 300. In this specification, features or components with reference numbers between 0-74 are features or components which can be used with the CAD n00 of the first, second or third embodiment of the invention.

Unless otherwise stated the following passages refer to the first, second and third embodiments of the invention.

The CAD n00 includes a motion detector 120,220,320 (n20) that is adapted to detect the operator's movement in or on the support 50 without physical contact with the operator. On detecting a movement of the operator that is associated with a crush event, the CAD n00 is adapted to actuate the safety response.

Enacting the safety response involves engaging a kill switch to disengage the scissor lift and vehicle drives 62,72 or to switch off the associated motors, so that height and land-based movement is immediately stopped with a view to avoiding the crush event. The actuation of the kill switch is adapted to fix the support in place before the crush event occurs. The kill switch is adapted, on actuation, to immediately halt both the operation of the scissor lift drive mechanism 62 and the motion of the vehicle 70, applying vehicle brakes, if applicable, but not suddenly whereby to risk destabilising the support 50. The kill switch is an electronic circuit breaker that electronically stops the operation of the drive mechanisms 62,72 to freeze movement of the support and stop land-based movement of the vehicle 70 on which the EWP is mounted.

The EWP 10 in the embodiment shown is a scissor lift. The support 50 includes a work platform 54 and the peripheral cage 52 that can be a crush hazard if the operation of the drives 62,72 proceeds unchecked as conditions for a potential crush event emerge.

The operator is typically instructed to standard in an orthodox and predictable position in front of the console 20, within arm's reach of the joystick 22. This predictability allows the CAD n00 to be configured to detect an operator, identify the operator's operational position, and to detect movements forward, back or to the side that may be associated with a sequence of movements preparatory to a crush event.

As is standard for EWPs, the MCS 20 includes a computer processor and a manual control device in the form of a toggle button 21 and a joystick or hand lever 22 that form part of a console 24. The console 24 is mounted on the support 50 within the confines of the cage 52. By engaging the toggle button or switch 21, the operation of the hand-lever 22 can be toggled between alternative vertical scissor lift 60 and/or lateral vehicle 70 or support 50 movements.

The manual control device 20 may sit in a cradle 26 in the console 20 and be detached for remote operation by the operator as a vehicle 70 pilot. For example, when proceeding through narrow entrances such as doorways, the operator is required to alight the vehicle 70 (including the support 50) and to remotely operate the vehicle 50 until it is moved safely through the entrance or otherwise passed a hazardous obstacle, situation or location.

The CAD n00 is adapted to be installed either during manufacture of the EWP 10 as an after-sales service or retrofit. The CAD n00 is in wireless communication with the MCS 20 and the kill switch.

The CAD n00 includes a housing 102,202*a,b*,302*a,b* that contains internal component parts. The housing 102,202*a,b*,302*a,b* is mountable to a side of the console 24 by means of fasteners extending through registered apertures 104,204, 304 (n04) formed in mounting flanges 106,206,306 (n06) and a side wall of the console 24.

A combination of predetermined algorithms are used by a processor of the CAD n00 such that it is adapted to:

(e) Sense that an operator is present on or in the support 50; and/or (f) Map the simple dimensions and shape of the support 50 on or within which the operator is intended to be confined during the operation of the EWP 10; and/or (g) Determine the parameters of the operator, including body shape and/or dimensions; and (h) Detect one or more of the movements of the operator that is/are associated with a crush event.

The motion detector n20 is operable to detect movement of the operator that is associated with the crush event without physical contact with the operator.

The motion detector n20 is mounted or located in or on the housing 102,202*a,b*,302*a,b*. The motion detector includes a pair of small adjacent panels 122,222,322 (n22), 124,224,324 (n24) including a transmitter n22 and a receiving sensor n24.

The motion detector n20 uses LIDAR (Light Detection and Ranging) technology that is capable of measuring a distance to a target by using the transmitter n22 to project laser light onto the target and measuring the reflected light with the receiving sensor n24. The laser emitter or transmitter n22 is configured to emit light of between 800 nanometres (nm) and 900 nm. The power usage of the laser emitter n22 is 550 milliwatts. The laser emitter n22 includes a light emitting diode (LED). A field of view of the motion detector n20 is 4.2°.

The motion detector n20 is configured to obtain data to map the size, dimensions, profile and/or body shape of the operator. The data is fed to the crush avoidance device processor 110,210,310 (n10) as variables. The processor n10 is able to calibrate the motion sensor n20 by the application of the data and variables to the combination of predetermined algorithms. The motion detector n20 is configured to individually measure amplitude and direction of acceleration and velocity as well as the position of parts of the operator and the operator's clothing relative to the position of the motion detector n20. The algorithms involve variable data input, such as acceleration, velocity and vector orientation. The processor may incorporate adaptive technology to refine the algorithms, by operator and real event feedback, to progressively avoid false positives (i.e. false triggering of the kill switch).

The CAD n00 is configured to calibrate the motion detector n20 for different sized and shaped operators. The MCS 20 includes a touch screen 28 which is used to monitor and control a "dead man switch". The dead man switch 27 can be located on the operator hand-lever 22. Pushing this switch 27 allows the operator to use the EWP's 10 controls on the console 24 to operate the EWP 10 because the crush avoidance device's n00 processor n10 detects the activation of the dead man switch 27. Once the dead man switch 27 is activated, the CAD n00 is configured to take measurements of the position of parts of the operator to calibrate the CAD n00 and to adjust to limits of the movement of the operator that is associated with a crush event.

The one or more movements of the operator that are associated with a crush event or anticipation thereof include the following:

Sudden acceleration of the operator's torso toward a side or end of the support 50;

Operator moves out of the defined normal workspace with respect to the motion detector n20 mounting point;

Operator's acceleration is high; or

Operator's position relative to the motion sensor n20 is low.

The CAD n0 may further include a support motion detector configured to measure amplitude and direction of acceleration and velocity and position of the support 50. The support motion detector includes a "nine degrees of freedom inertial motion unit" (9DOF). The 9DOF includes an accelerometer, a gyroscope and/or a magnetometer. The 9DOF advantageously includes 3 accelerometers, 3 gyroscopes and 3 magnetometers. The 9DOF is configured to measure the amplitude and direction of acceleration and velocity and position of the support 50. The 9DOF may be configured to measure whether the support is moving in any direction, such as backward or forward, left or right, and/or up or down. The processor n10 is configured to use measurements from the 9DOF and the LIDAR to detect a potential crush event. For example, if the support 50 is moving backward, it is more likely that the operator will be hit on the opposite side to the LIDAR and therefore move towards the LIDAR motion detector n20. Therefore, movement of the operator associated with a crush event may include the support 50 moving backward and the operator rapidly moving a certain distance and/or acceleration forward in a pattern characterising movement preparatory to a crush event of the operator against a front rail of the cage 52.

The CAD n00 is configured such that to first operate the EWP 10, the dead man switch 27 of display 28 must be pressed and therefore the CAD n00 must be calibrated to the operator. The current position of the operator is measured via the LIDAR motion detector n20 and the current spatial position of the scissor lift 60 and EWP 10 is measured by the 9DOF to provide stat for the initial starting or base-line condition. The IMU (Inertia Measurement Unit) provide cost-effective spatial positioning information using a triad of accelerometers and gyroscopes. The CAD n00 is configured to start detecting movement of the operator after the CAD n00 has been calibrated. Operation of the vehicle 70 and the scissor lift 60 is only enabled when this process is completed. When a crush event (or the parameters predictive of a crush event) is detected, the dead man switch 27 circuit will be opened, stopping the EWP 10 (including the vehicle 70 and the scissor lift 60), and the CAD's n00 horn 126, 226,326 (n26) is sounded, together with a visual alert, such as a flashing blue strobe light 125.

The LIDAR motion sensor n20, 9DOF and/or processor n10 may include Wi-Fi communication devices 114,214 configured for the LIDAR n20 and 9DOF to communicate with an internal web server in the processor n10 for calibration, diagnostic reporting, configuring and viewing of logs of measurements taken form the LIDAR n20 and 9DOF.

The CAD n00 can include an alert device n26 that is configured to generate an audible and/or visual alert to warn the operator and others of an impending crush event and/or other events detected by the processor n10, LIDAR n20 and 9DOF. The other events may include system errors. The alert device 125,n26 includes a speaker n26 and/or a light 125, including a preferably blue strobe light. The speaker n26 may project voice outputs such as "lift stopped due to crush event detected from rear". The alert device 125,n26 and/or the processor n10 can include an audio voice output CODEC via the speaker n26. Advantageously, the voice outputs are pre-configured to communicate any actions taken by the CAD n00 to an operator without training in or having in-depth knowledge of the CAD n00. The CODEC messages communicated through the audio output n26 to the operator to inform the operator as to the perceived crush event and instructions for proceeding, for example: "Hazardous Operator Movement Detected; Release Dead Man Switch to Restore Operation or Await Assistance". Preferably, the CAD n00 initiates a timing sequence of, for example, 10 seconds, before the operator can resume control of the CAD n00, after releasing the dead man switch 27.

Preferably, the CODEC messages communicated through the audio output n26 to the operator to inform the operator of a perceived crush event include the following:

The phrase "operator movement" or synonymous phrases indicating that the reason for detecting a crush event is that the operator moved too suddenly or erratically; and The phrase "operator position" or synonymous phrases indicating that the operator has moved too far from the calibration area or the operator is not within line of sight of the sensor.

If the operator continues to hold the dead man switch 27 after the CAD n00 has detected a crush event, the speaker n26 or a horn projects or sounds at least once, preferably 3 times. To move or operate the vehicle 70 and/or EWP 10 again, the operator must release the dead man switch 27, wait a time period, and then press the dead man switch 27 again. The time period may be less than 3 seconds.

The CAD n00 is adapted such that the speaker n26 also announces a movement mode of the EWP 10 and/or vehicle 70. Advantageously, this feature audibly reminds the operator of expected movement of the EWP 10 and/or vehicle 70. The CAD n00 is adapted such that the speaker n26 projects the following movement modes:

The speaker n26 announces the word "elevate" or synonymous words when the EWP 10 is set to move up or down; and/or The speaker n26 announces the word "drive" or synonymous words when the EWP 10 is set to move forward or backward.

Figure 5:
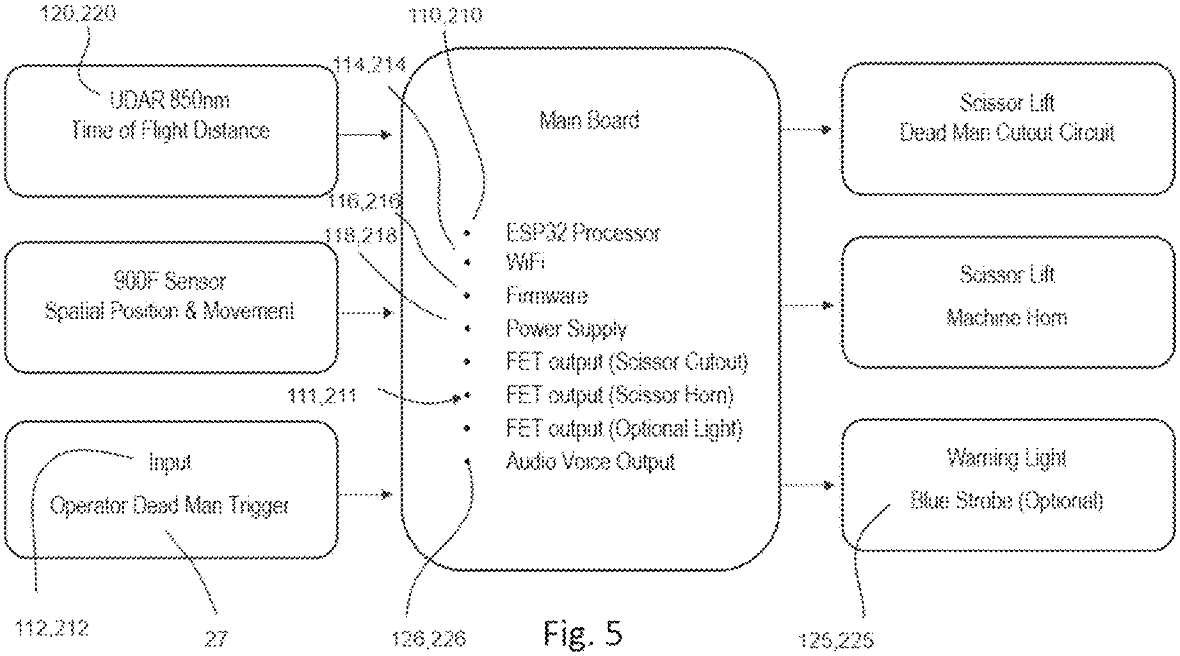
FIG. 5 is a schematic diagram of hardware and interactions between hardware of the crush avoidance device according to the first or second embodiment of the invention.

The hardware and mechanical design of the CAD 100,200 according to the first and second embodiments of the invention is best represented in FIGS. 4*a*-*f* and the flowchart of FIG. 5.

The CAD n00 is a stand-alone system that is configured to be mounted onto the side of the MCS in the form of a scissor lift control box (console) 24 and via a hardwire terminal 108,208,308 (n08) connects into the scissor lift control box 24 for power and to utilise the existing cutout (or dead man switch) 27 functionality of the control box 24.

The LIDAR movement sensor n20 is designed to be IP67 rated, robust, small, streamlined and non-intrusive to the scissor lift support 50 workspace. The LIDAR sensor n20 has smooth flush surfaces to resist gathering dust/detritus build up on a LIDAR sensor n20 face.

The CAD n00 includes within its housing 102,202*a*,*b*, 302*a*,*b* its internal hardware components. The CAD 100 includes an external M12 screw lock connector 108 for the CAD's 100 wiring requirements.

The LIDAR sensor n20 is a time of flight distance sensor that uses infrared (850 nm) laser to measure the distance from the sensor n20 to the target. In the present invention, the target is the operator who preferably stands on the platform 54 within about 200 millimetres (mm) in front of the sensor n20. The set up or baseline information derived by the CAD n20 is subsequently used in operation to determine if the operator moves forward or backward from the LIDAR sensor n20.

The LIDAR sensor n20 is also used to measure the operator's movement speed and acceleration relative to the console 24. When the operator presses the dead man switch 27 on the manual joystick lever 22 the CAD n00 takes a measurement via the LIDAR sensor n20 for the distance to the operator at periodic intervals (say every 100 ms). This allows for real time calibration of the and each individual operator, depending on the operator's height and size, etc., and adapts to the dimensions of each new operator who takes control of the EWP 10.

The 9DOF sensor provides information on the supports 50 position in space. The 9DOF sensor also provides information on the various movement directions. This sensor data is used to determine which way the EWP 10 vehicle 70 and scissor lift 60 is moving. This sensor information is fed into the CAD's n20 firmware and fuses or is processed with the LIDAR sensor n20 derived data, to determine if the operator is in danger by virtue of an impending crush event.

The following passages refer to the first and second embodiments of the invention. Input 112,212 is a VCC (higher voltage) or GND (ground) switching digital input which is linked to the dead man switch 27. The operator must hit the dead man switch 27 in order to operate the EWP 10. When this input 112,212 is active, the CAD 100,200 will calibrate the position of the operator, the EWP's 10 current spatial orientation, and then start the main process/crush event detection routines.

The processor 110,210 includes a microprocessor chip which serves as the CAD's 100,200 processor for the main computational functions.

Wi-Fi 114,214 connectivity is coupled to the processor 110,210 and is used for the CAD's 100,200 calibration, diagnostic reporting, configuration and viewing of log data. The processor 110,210 and/or an external internet server may be adapted to record and playback the data logs such as crash event history. The processor 110,210 includes an internal clock 130,230 to record the time of each event or data of the data log. The Wi-Fi 114,214 provides access to an internal web server located in code on the processor 110,210.

Firmware 116,216 is programmed into the processor 110,210 and provides the main system functionality code.

Power supply 118,218 supplies rails for the various sensors 120,220 etc.

FET (field-effect transistor) outputs 111,211 are used to control the EWP 10 dead man cutout, the EWP's horn and an optional external blue strobe light 125,225.

Figure 6:
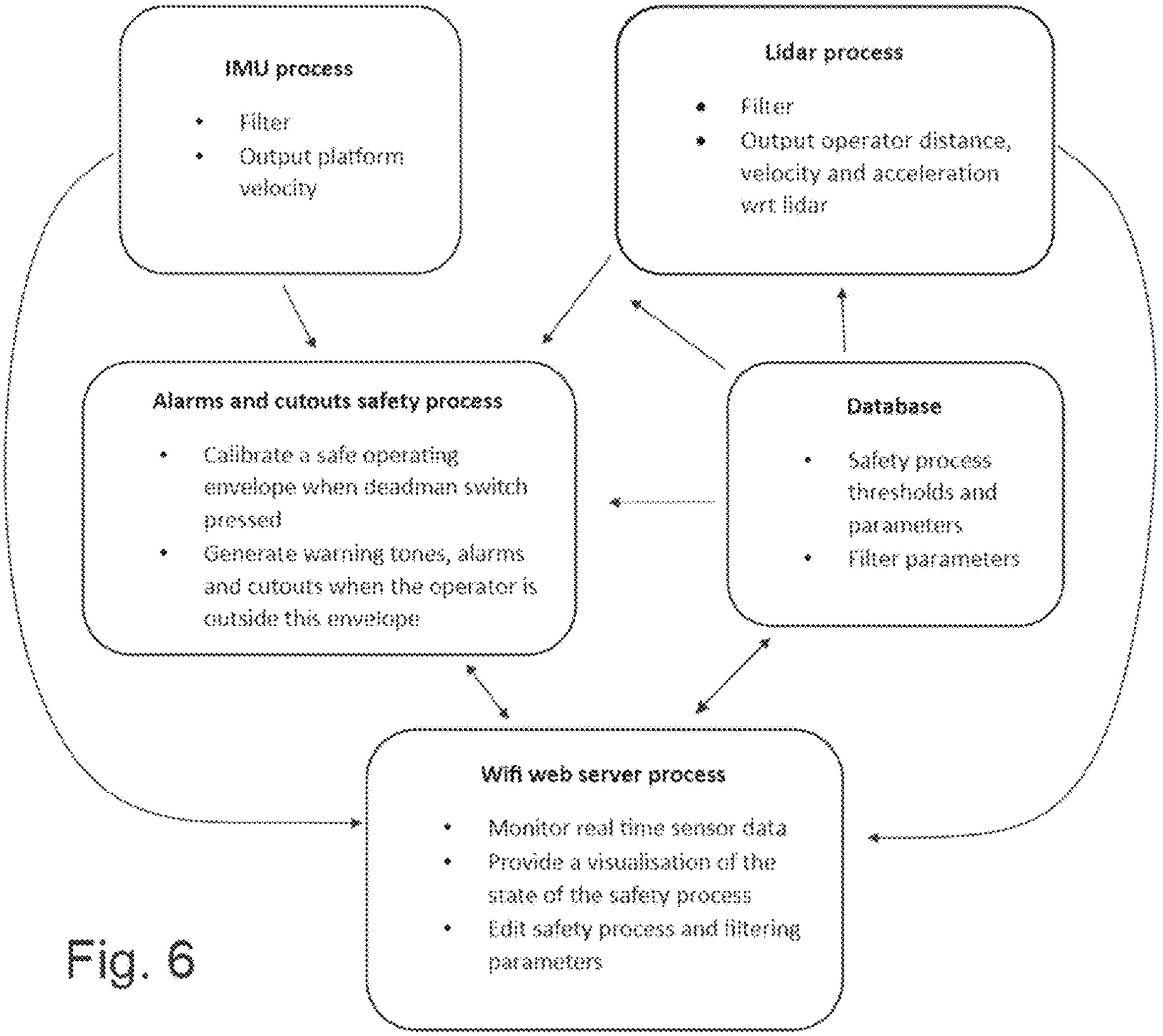
FIG. 6 is a schematic diagram of software and interactions between software processes according to the first or second embodiment of the invention.
Figure 7:
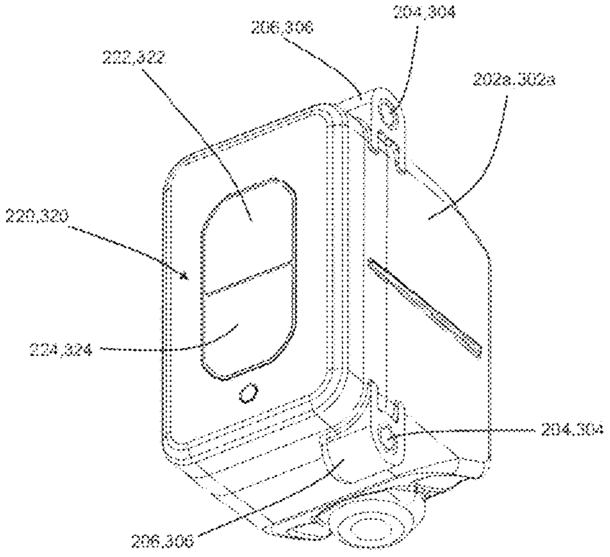
FIG. 7 is an isometric view of a motion detector and motion detector housing of the crash avoidance device according to the second or third embodiment of the invention.
Figure 8:
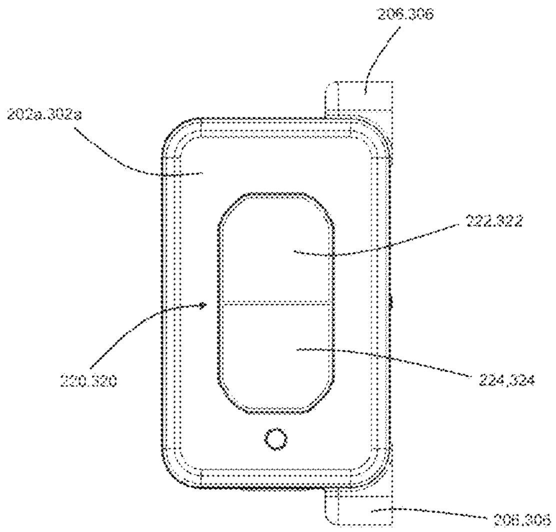
FIG. 8 is a right-side view of the motion detector and motion detector housing of the crush avoidance device according to the second or third embodiment of the invention.
Figure 9:
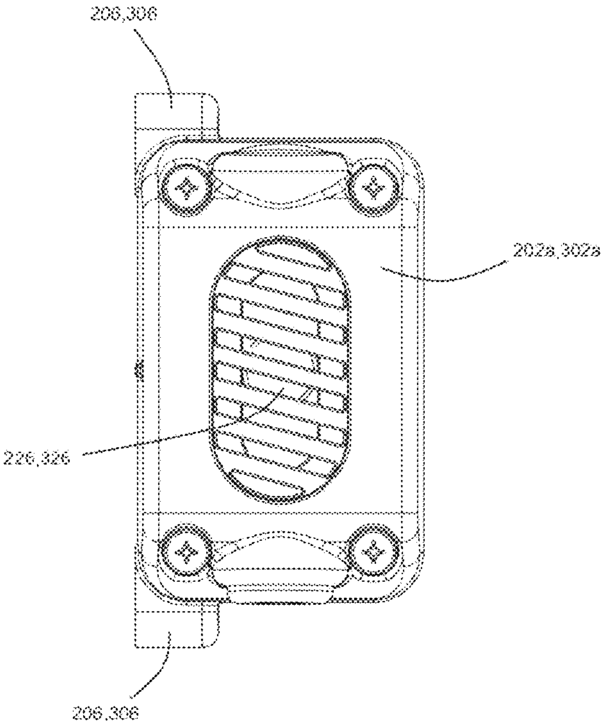
FIG. 9 is a left-side view of an alert device and motion detector housing of the crush avoidance device according to the second or third embodiment of the invention.
Figure 10:
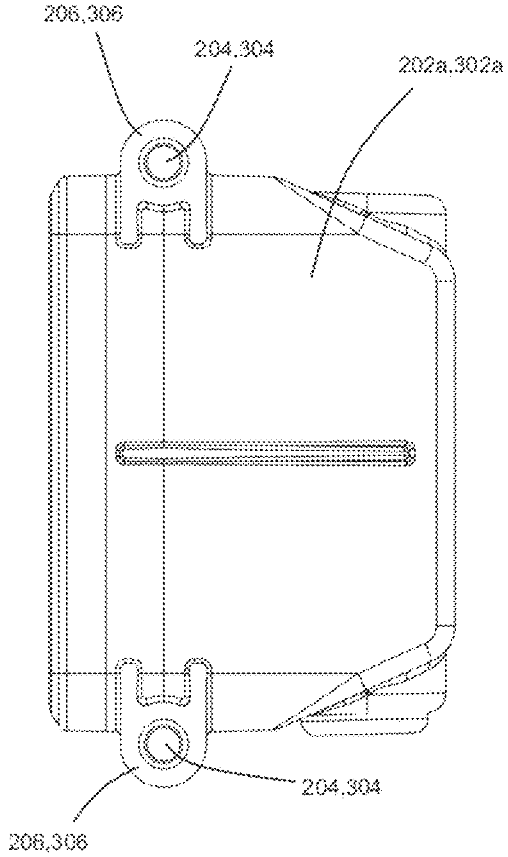
FIG. 10 is a rear view of the motion detector housing of the crush avoidance device according to the second or third embodiment of the invention.
Figure 11:
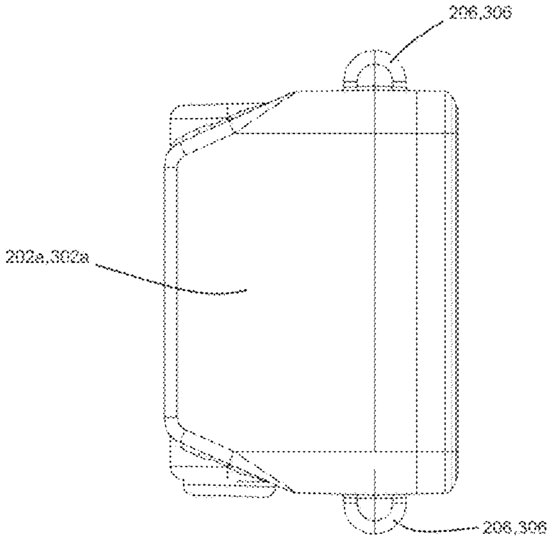
FIG. 11 is a front view of the motion detector housing of the crush avoidance device according to the second or third embodiment of the invention.
Figure 12:
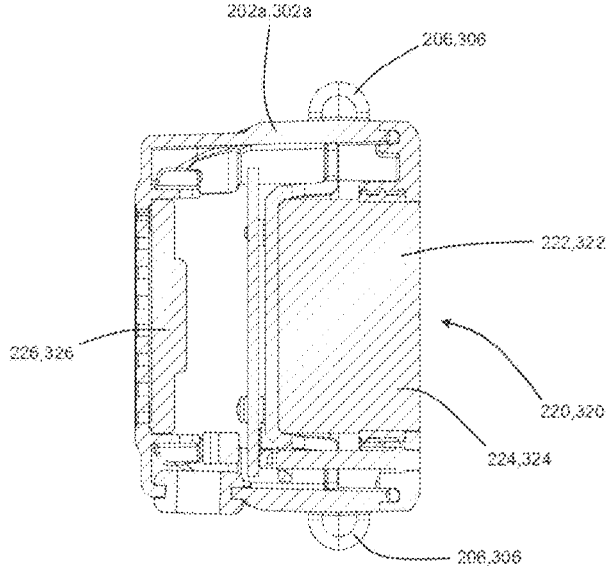
FIG. 12 is a front cross-sectional view of the motion detector, alert device and motion detector housing of the crush avoidance device according to the second or third embodiment of the invention.
Figure 13:
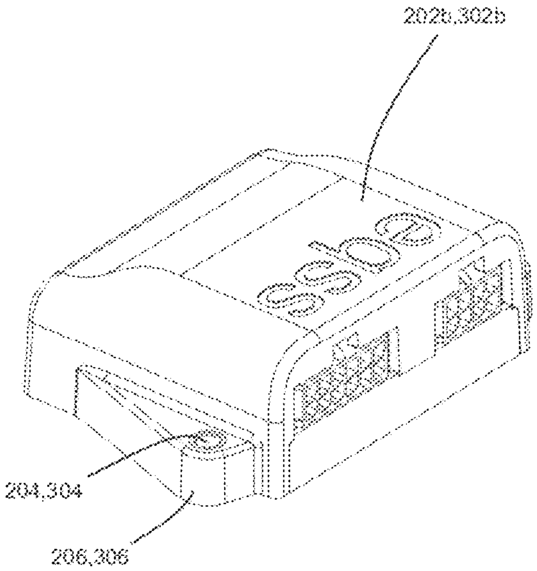
FIG. 13 is an isometric view of a processor housing according to the second or third embodiment of the invention.
Figure 14:
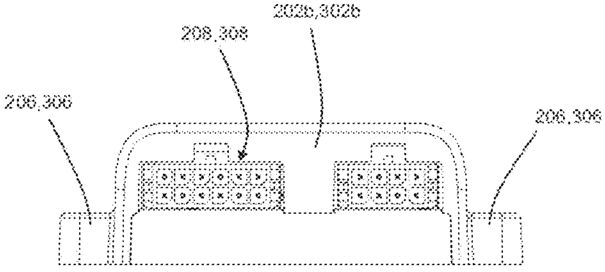
FIG. 14 is a right-side view of the processor housing according to the second or third embodiment of the invention.
Figure 15:
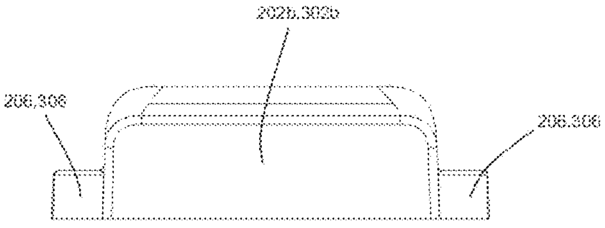
FIG. 15 is a left-side view of the processor housing according to the second or third embodiment of the invention.
Figure 16:
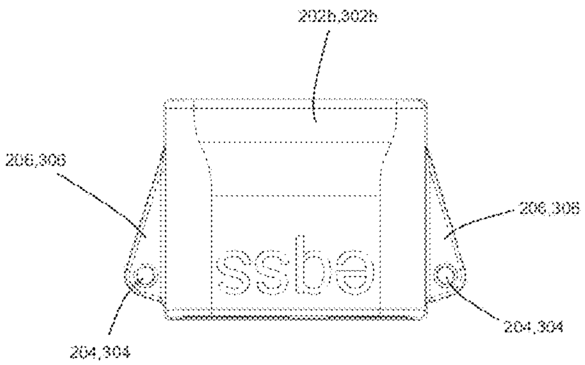
FIG. 16 is a front view of the processor housing according to the second or third embodiment of the invention.
Figure 17:
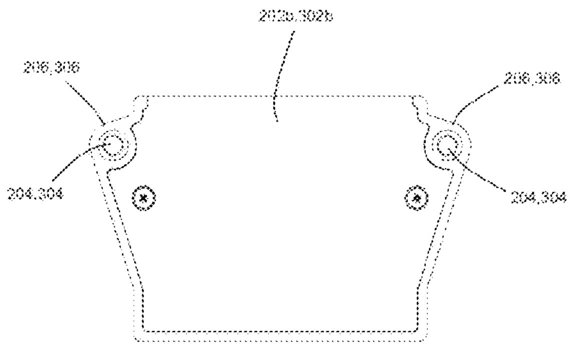
FIG. 17 is a rear view of the processor housing according to the second or third embodiment of the invention.
Figure 18:
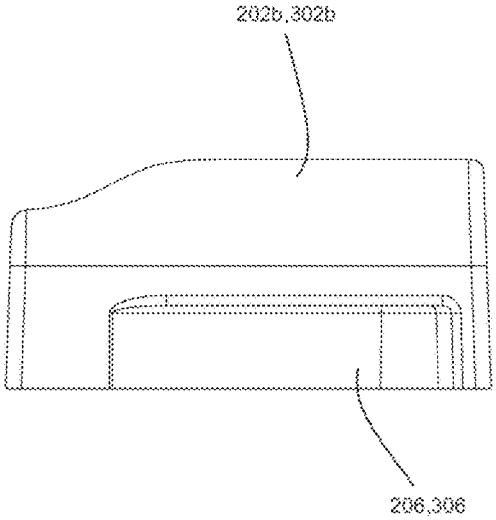
FIG. 18 is a bottom view of the processor housing according to the second or third embodiment of the invention.
Figure 19:
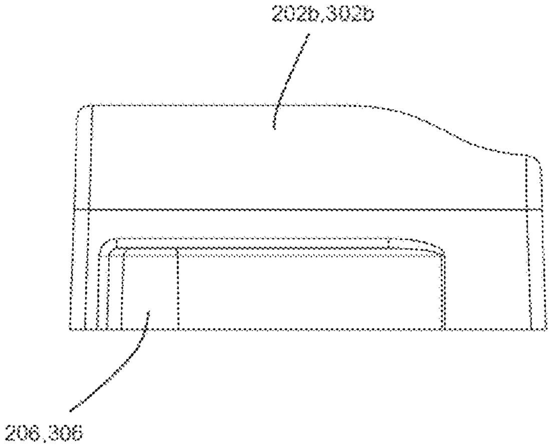
FIG. 19 is a top view of the processor housing according to the second or third embodiment of the invention.
Figure 20:
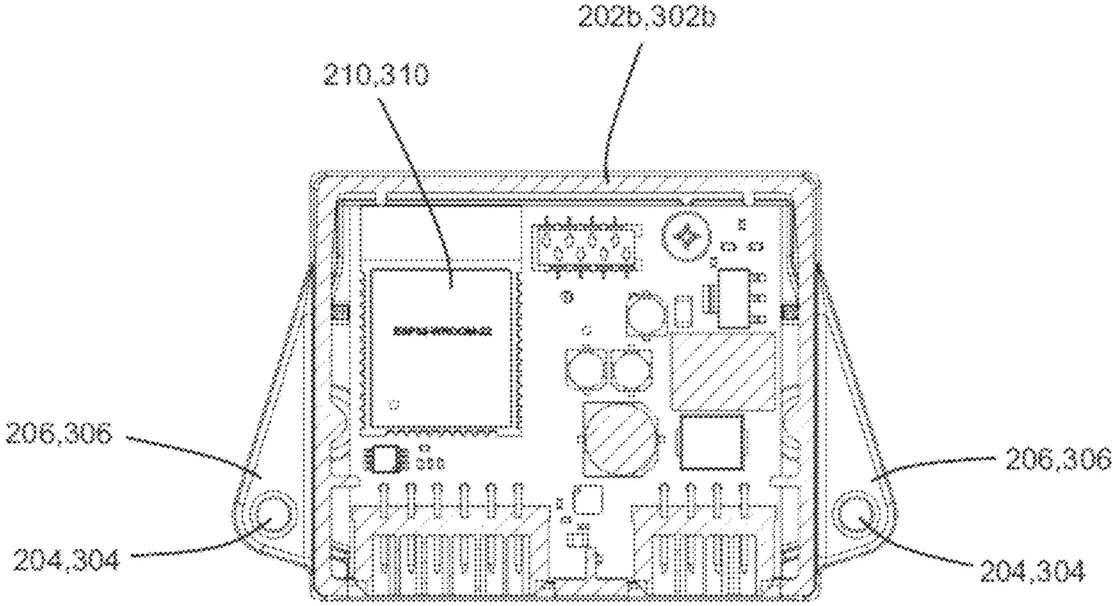
FIG. 20 is a front cross-sectional view of a processor and processor housing according to the second or third embodiment of the invention.
Figure 21:
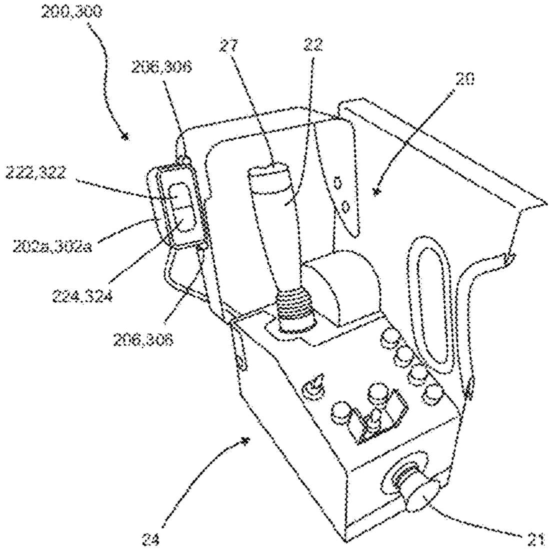
FIG. 21 is an isometric view of the motion detector and motion detector housing mounted to a console according to the second or third embodiment of the invention.

Software and firmware of the CAD 100,200 is represented in the flowchart of FIG. 6.

Figure 23:
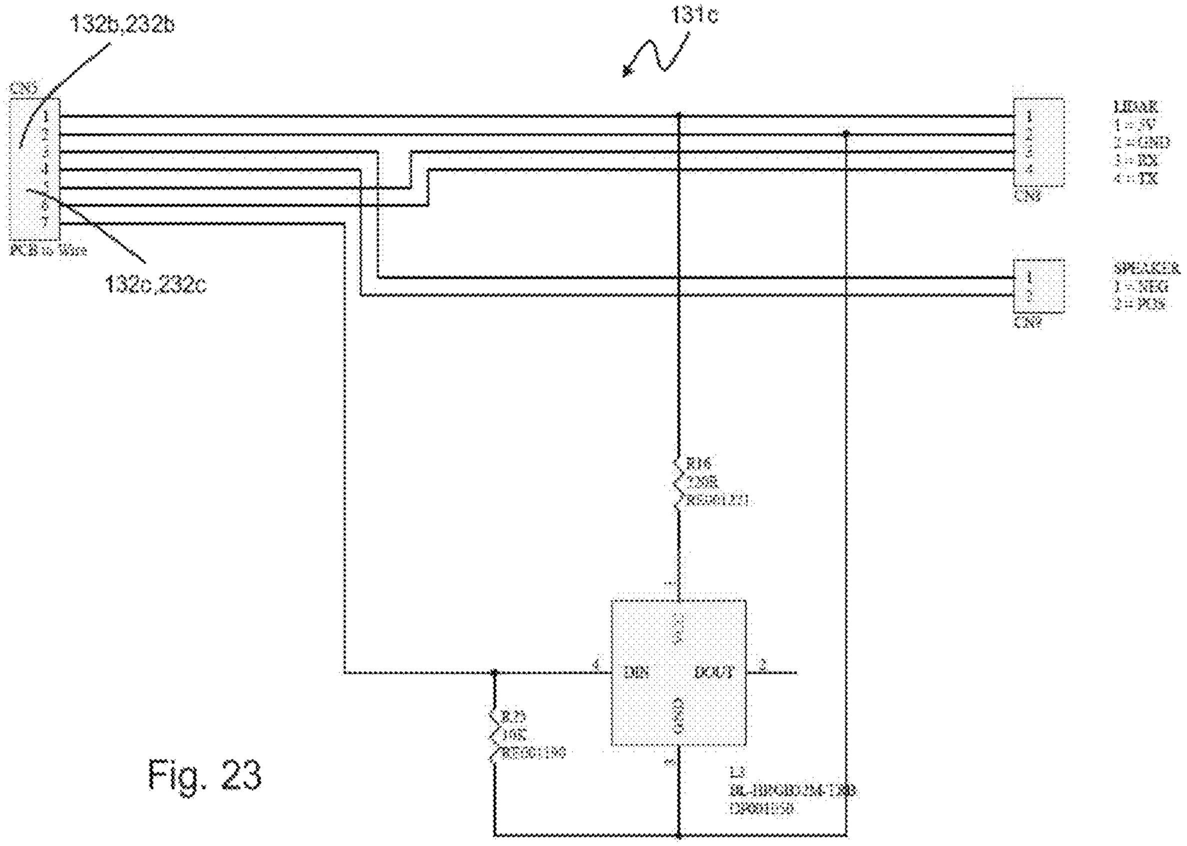
FIG. 23 is a schematic diagram of circuitry of an audio interface of the crush avoidance device according to the first or second embodiment of the invention.
Figure 24:
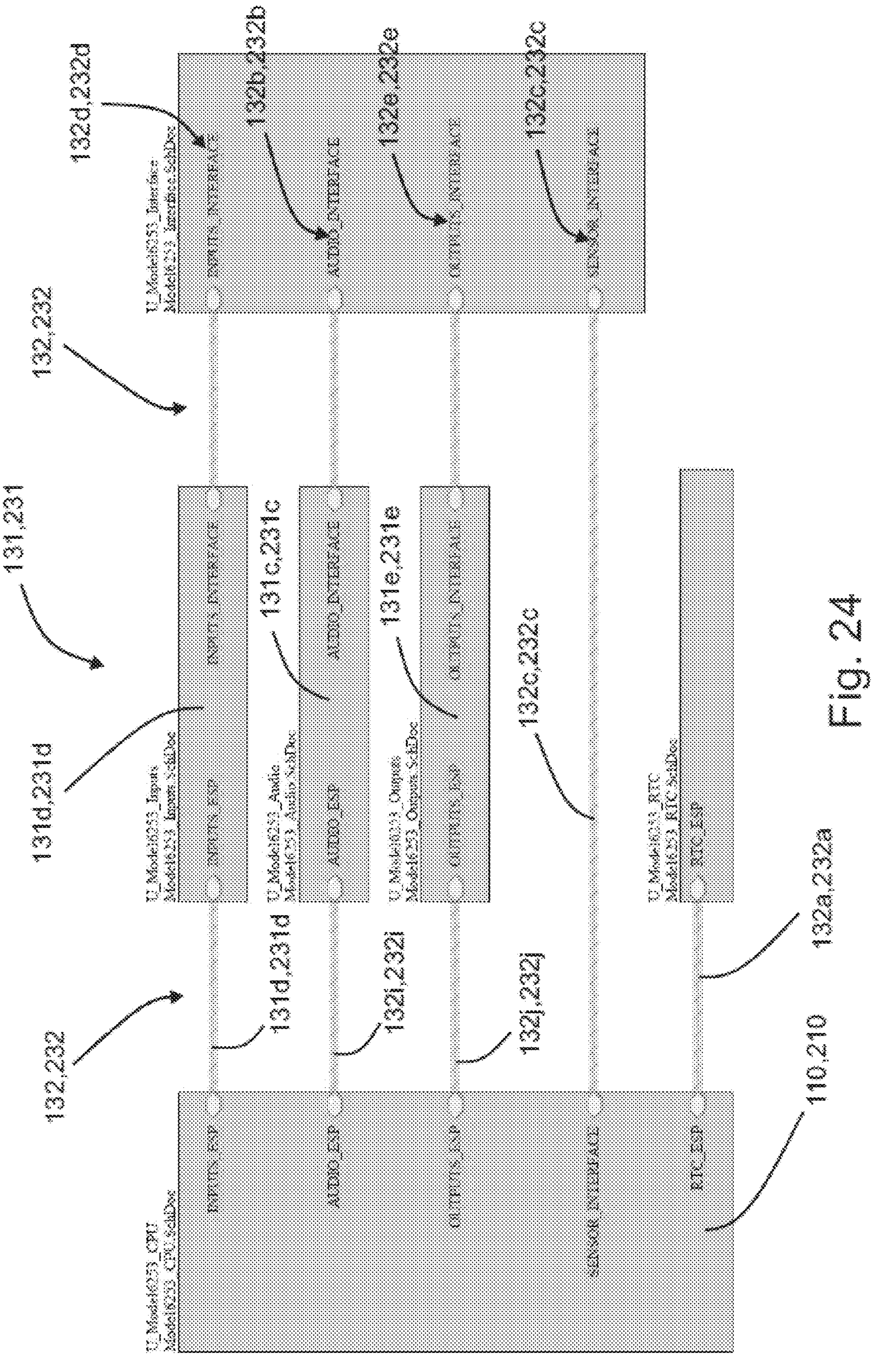
FIG. 24 is a schematic diagram showing an overview of circuitry of the crush avoidance device according to the first or second embodiment of the invention.

A more detailed representation of the electronic hardware of the CAD 100,200 is shown in schematic diagrams in FIGS. 22-30. An overview of how the circuit schematic diagrams of FIGS. 22-23 and 25-30 connect together to form schematic diagrams of circuitry for the CAD 100,200 is shown in FIG. 24. The rectangles 131,231 shown in FIG. 24 represent circuitry and computer hardware components and the lines 132,232 in FIG. 24 represent wires or interfaces 132*a*-*f*,232*a*-*f*. The computer processing unit (computer processor) 110,210 represented by a rectangle in FIG. 24 performs calculations and may store data for the CAD 100,200. The interfaces 132*a*-*f*,232*a*-*f* also represented in part by a rectangle in FIG. 24 include wires and plugs to send and/or receive data from CAD 100,200 components such as the speaker 126,226 (through the audio interface 132*b*,232*b*), the LIDAR 120,220 (through the sensor interface 132*c*,232*c*), input devices such as buttons 21,22 and the dead man switch 27 (through the inputs interface 132*d*,232*d*) and output devices such as the EWP 10 (through the outputs interface 132*e*,232*e*).

Figure 22:
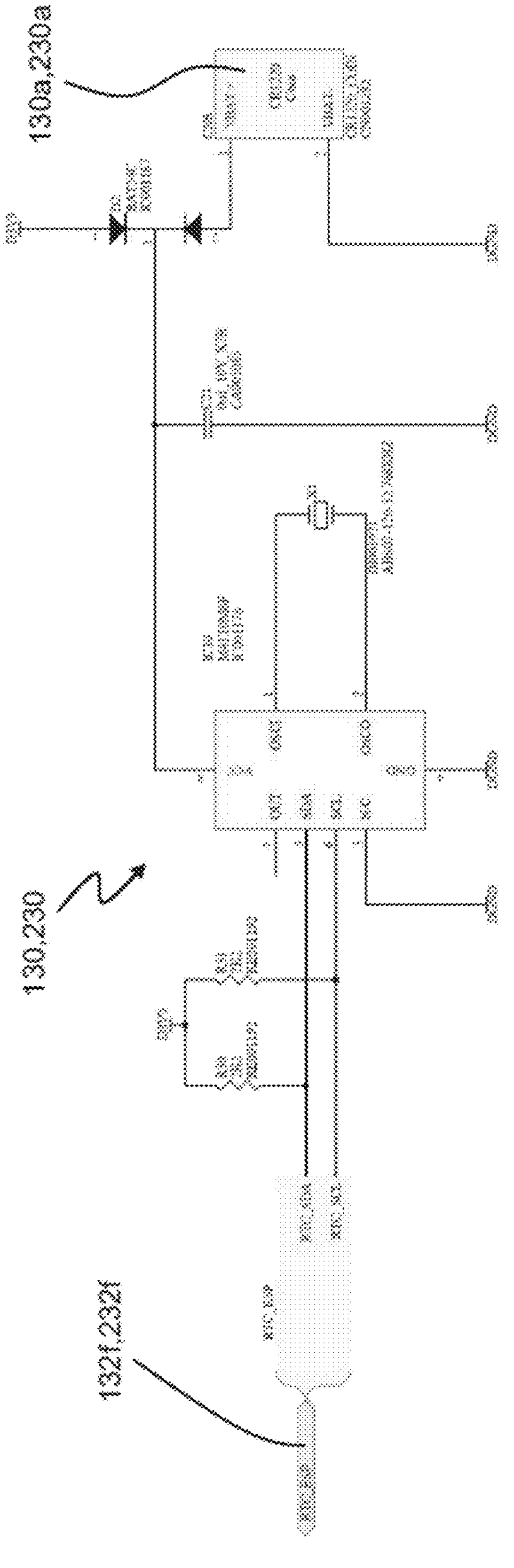
FIG. 22 is a schematic diagram of circuitry of a real time clock of the crush avoidance device according to the first or second embodiment of the invention.
Figure 25:
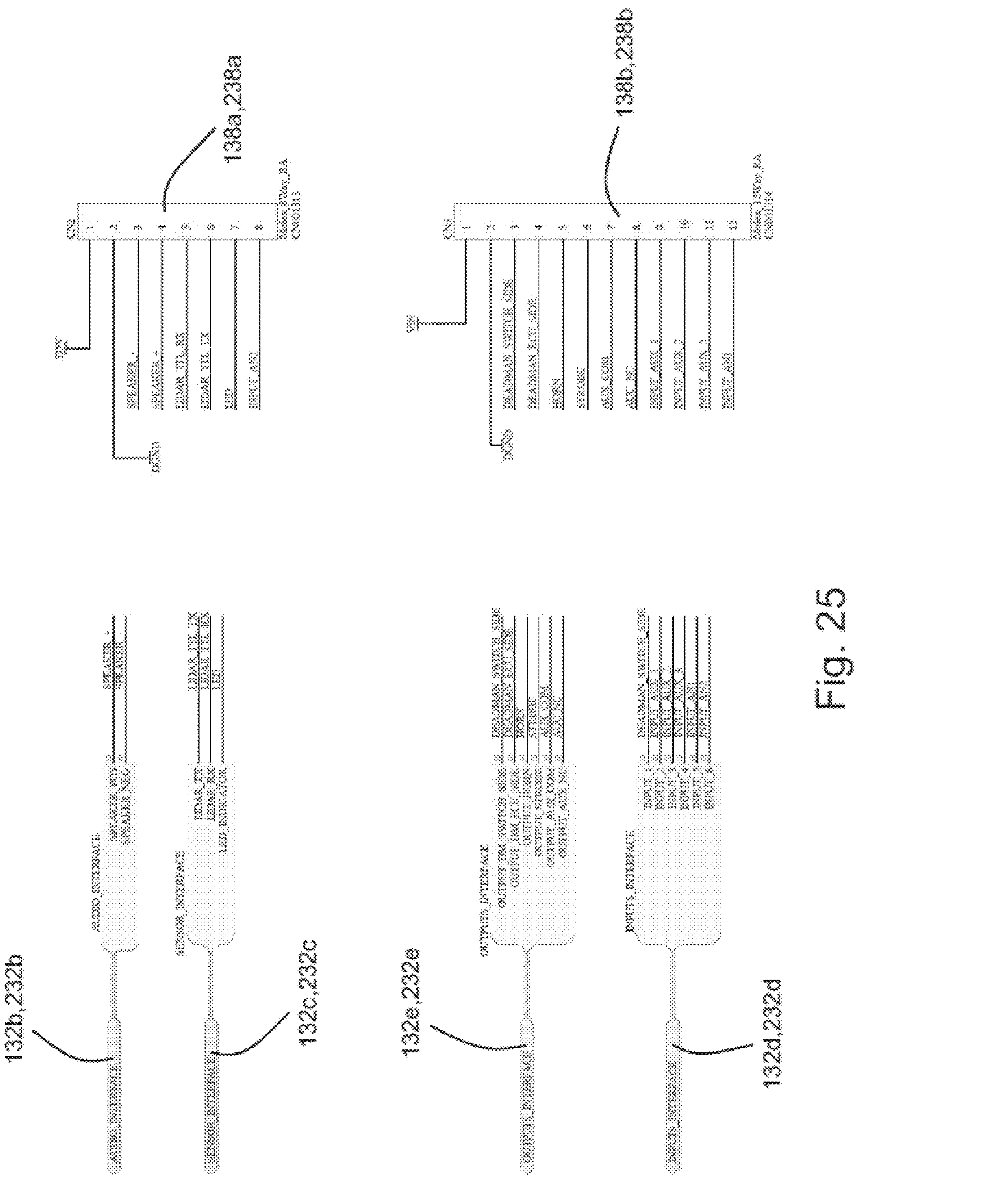
FIG. 25 is a schematic diagram of circuitry for a sensor, output and input interface plug of the crush avoidance device according to the first or second embodiment of the invention.

FIG. 22 shows a schematic diagram of circuitry of a real time clock 130,230 with it's own back up battery 130*a*,230*a*. A real time clock interface 132*f*,232*f* is shown in FIGS. 22 and 24. FIG. 23 shows a schematic diagram of circuitry of the audio interface 132*b*,232*b* with the speaker 126,226 and the LIDAR 120,220. The sensor interface 132*c*,232*c* connector is shown in FIG. 23-25. A sensor interface plug 138*a*,238*a* shown in FIG. 25 includes the sensor interface 132*c*,232*c* and the audio/speaker interface 132*b*,232*b*. An output and input interface plug 138*b*,238*b* shown in FIG. 25 includes the outputs interface 132*e*,232*e* and the inputs interface 132*d*,232*d*.

Figure 26:
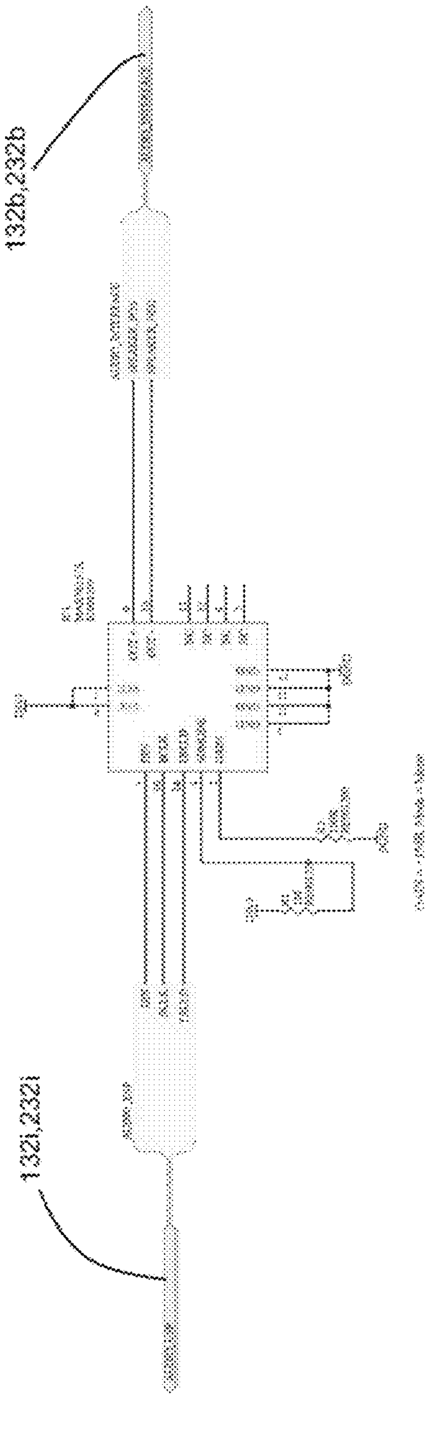
FIG. 26 is a schematic diagram of an audio and sensor circuit of the crush avoidance device according to the first or second embodiment of the invention.
Figure 27:
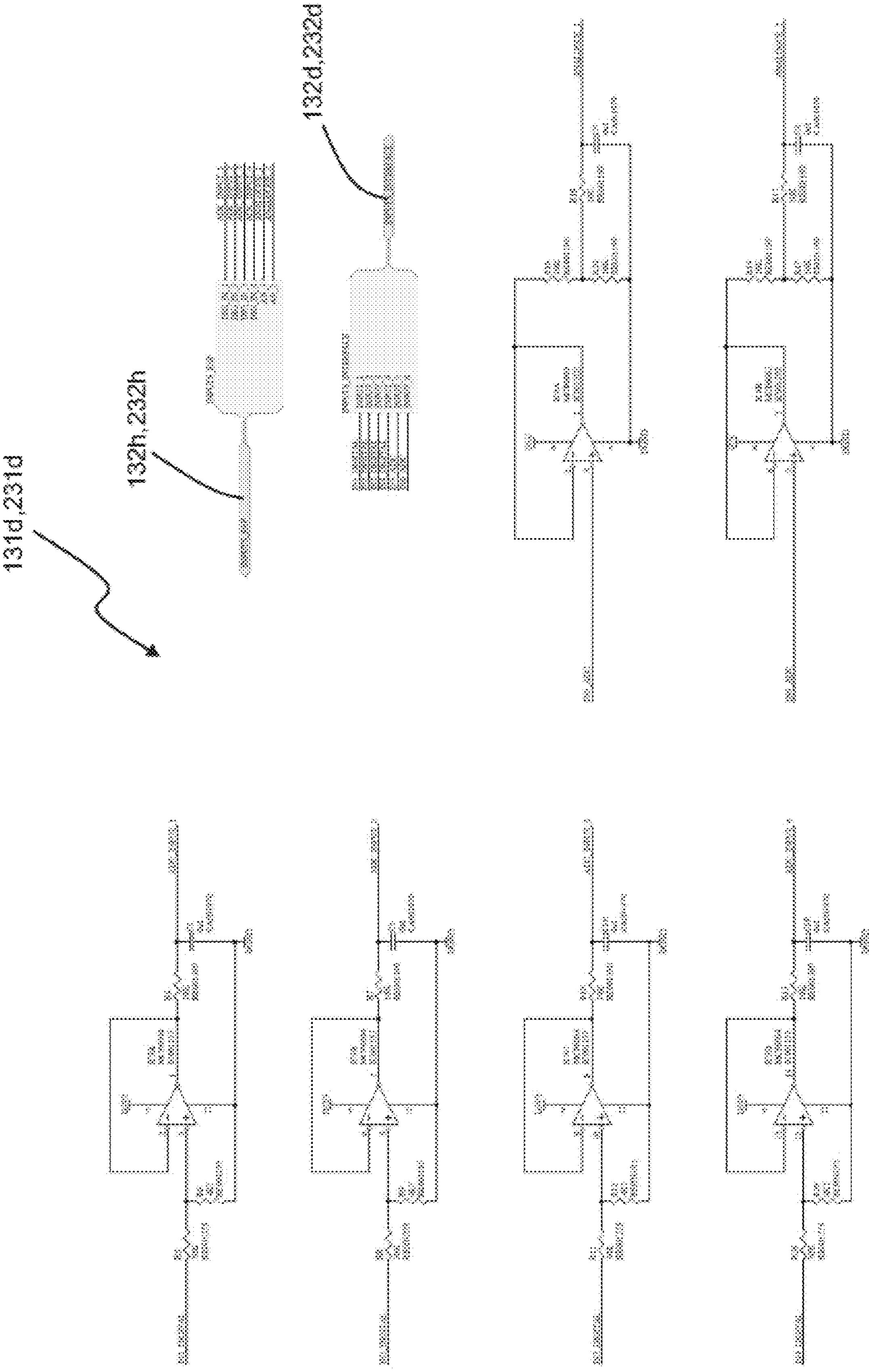
FIG. 27 is a schematic diagram of an input circuit of the crush avoidance device according to the first or second embodiment of the invention.
Figure 28:
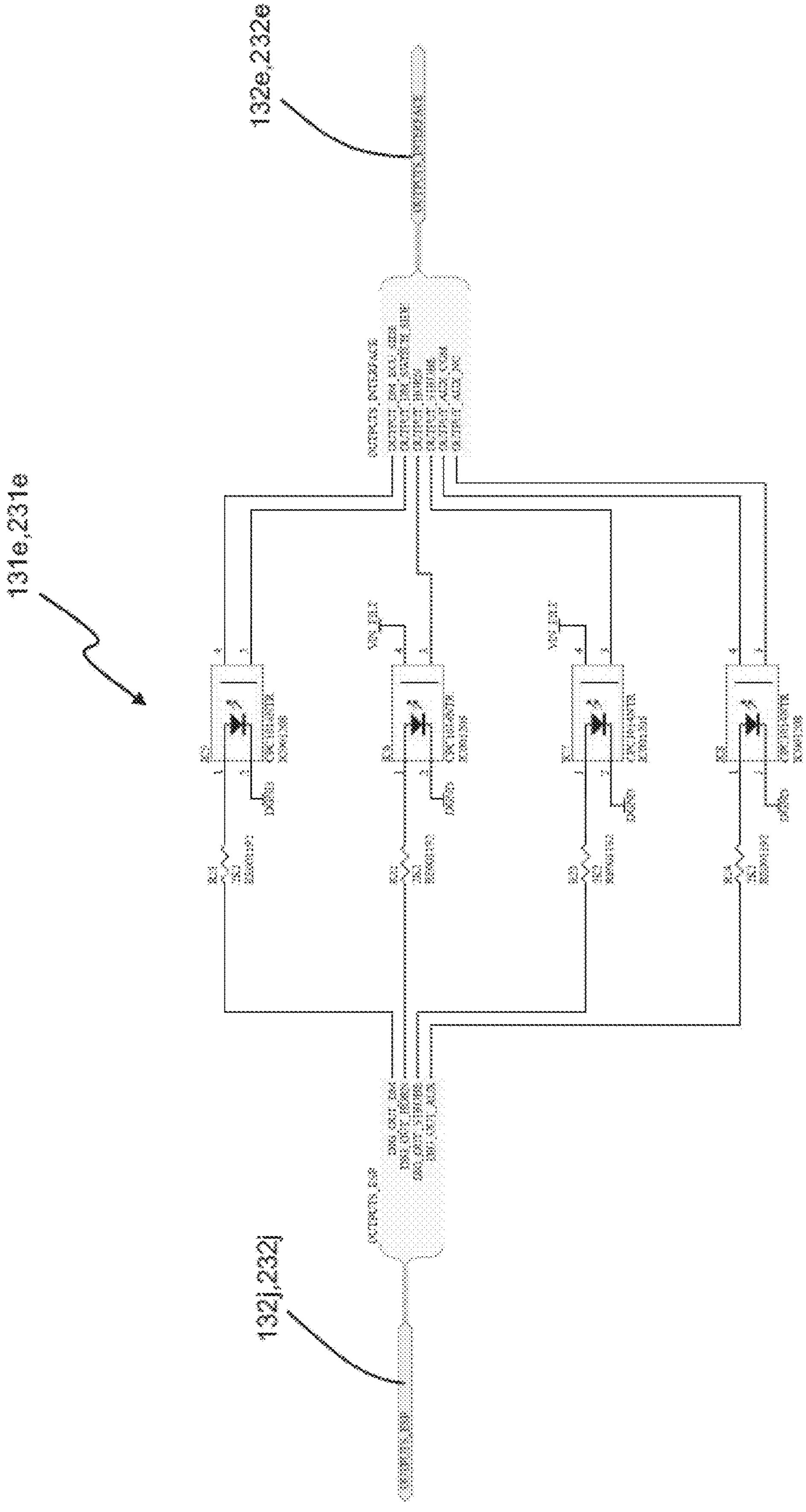
FIG. 28 is a schematic diagram of an output circuit of the crush avoidance device according to the first or second embodiment of the invention.

FIG. 26 shows an expanded view of an audio and sensor circuit 131*c* represented by a rectangle in FIG. 24. FIG. 27 shows an expanded view of an input circuit 131*d*,231*d* represented by a rectangle in FIG. 24. FIG. 28 shows an expanded view of an output circuit 131*e*,231*e* represented by a rectangle in FIG. 24.

Figure 31:
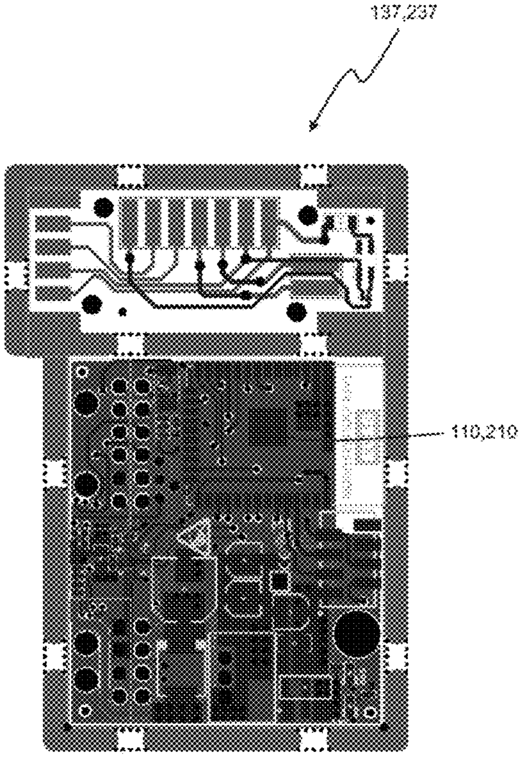
FIG. 31 is a schematic diagram of two printed circuit boards of the circuitry and computer hardware components shown in FIGS. 22-30.
Figure 29:
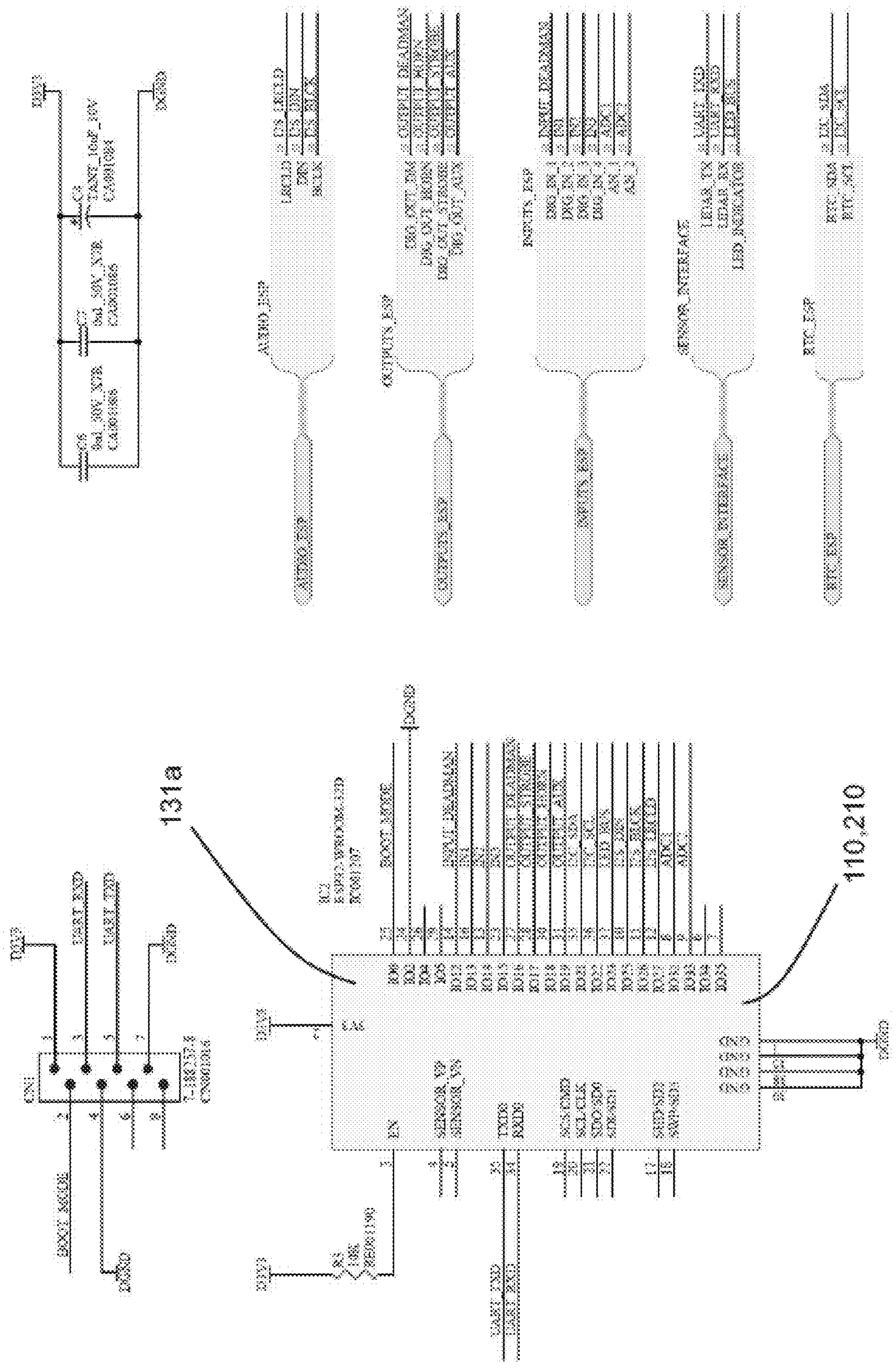
FIG. 29 is a schematic diagram of wires connected to a computer processing unit of the processor of the crush avoidance device according to the first or second embodiment of the invention.
Figure 30:
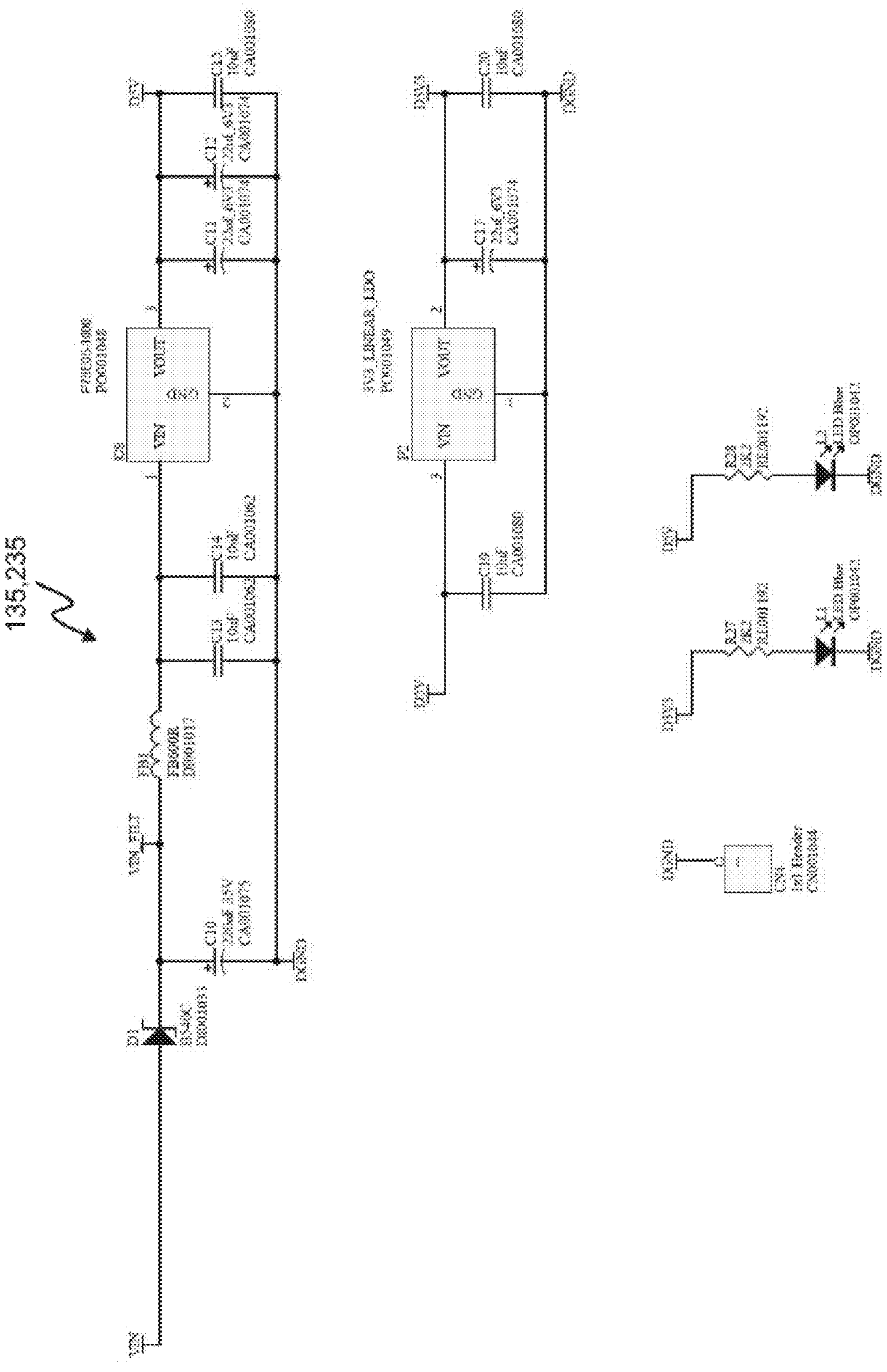
FIG. 30 is a schematic diagram of circuitry of a power supply of the crush avoidance device according to the first or second embodiment of the invention.

FIG. 29 shows an expanded view of wires connected to the computer processing unit (CPU) 110,210. Wires or interfaces 132*h*,232*h* connect the input circuit 131*d*,231*d* to the CPU 110,210. Wires or interfaces 132*i*,232*i* connect the audio and sensor circuit 131*c*,231*c* to the CPU 110,210. Wires or interfaces 132*j*,232*j* connect the output circuit 131*e*,231*e* to the CPU 110,210. FIG. 30 shows a schematic diagram of a power supply circuit 135,235. Wires and interfaces labelled the same and shown in FIGS. 22-30 are connected to each other. FIG. 31 is a schematic diagram of two printed circuit boards (PCB's) 137,237 for the circuitry and computer hardware components shown in FIGS. 22-30.

Figure 33:
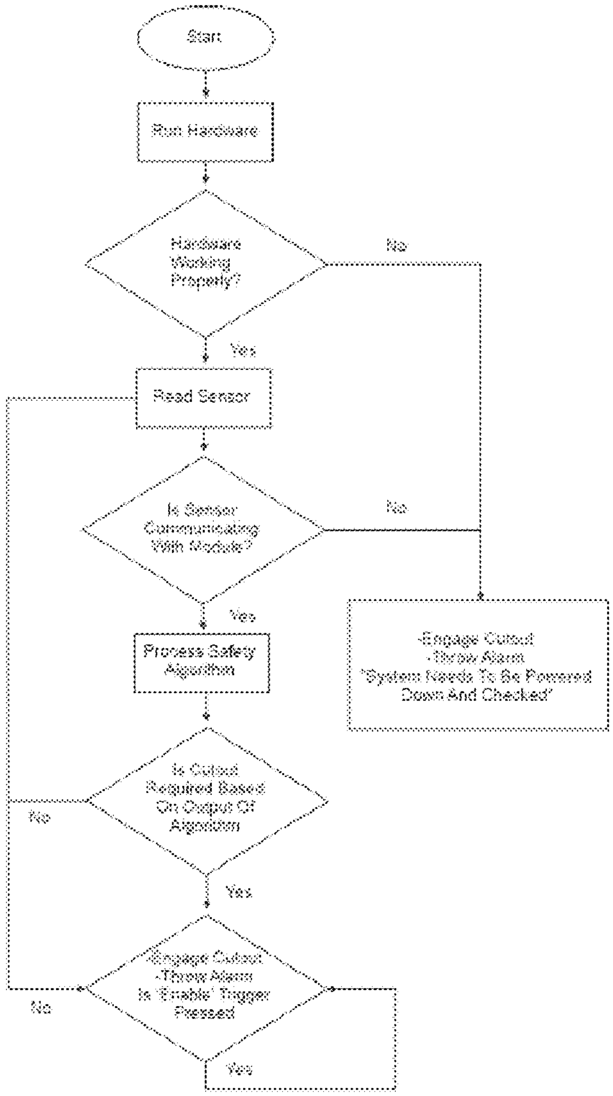
FIG. 33 is flow chart of an overview of functions and programming of software programmed into a processor of the crush avoidance device according to the third embodiment of the invention.
Figure 34:
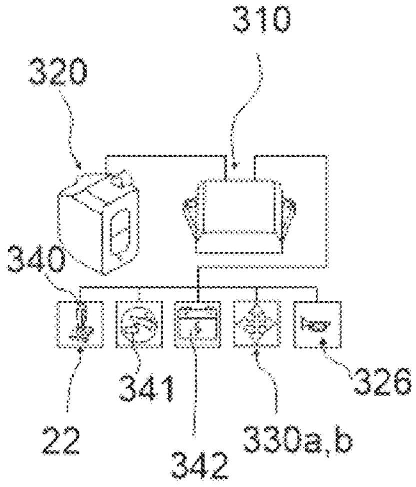
FIG. 34 is a schematic diagram showing interactions between sensors, processors and other devices of the crush avoidance device according to the third embodiment of the invention.

The following passages refer to the third embodiment of the invention. Schematic diagrams of electronic hardware and software of the CAD 300 according to the third embodiment of the invention are shown in FIGS. 32-34. FIG. 32 shows circuitry between a processor 310, MCS 20 and motion detector (LIDAR) 320. The third embodiment of the invention is the same as the second embodiment of the invention accept that the processor 310 of the CAD 300 according to the third embodiment of the invention additionally receives digital inputs from the drive and elevate switches 330*a*,*b* and analogue inputs from the joystick (hand lever) 22 for estimating or determining acceleration, velocity and change in position of the EWP 10. The processor 310 is configured to estimate or calculate the acceleration, velocity and change in position of the EWP 10 from the digital and analogue inputs and the 9DOF.

The processor 310 may include memory storage devices such as random-access memory (RAM) and solid-state drives (SSD) as well as a central processing unit (CPU). The processor 310 includes programming outlined by the flow chart in FIG. 33. After turning on or starting, the processor 310 is configured to first run all hardware of the CAD 300. If the processor 310 detects that the hardware is not running normally, the processor engages the kill switch (cutout) 340 and sounds an alarm with the speaker. If the processor 310 detects that the hardware is working properly, the processor

310 proceeds to read measurements from sensors including the motion detector 320, a 9DOF, digital inputs from the elevate switches 330*a,b* and the analogue inputs from the joystick 22. In this specification, the digital inputs are some of a discrete set of data points and analogue inputs are some of a large number of discrete or a continuous set of data points.

If the processor 310 detects that the sensors are not communicating with the processor 310, the processor engages the kill switch (cutout) 340 and sounds an alarm with the speaker. If the processor 310 detects that the sensors are communicating with the processor 310, the processor 310 runs the predetermined algorithm (process safety algorithm). If the processor 310 determines that the kill switch 340 should not be engaged based on the predetermined algorithm, the processor 310 proceeds to detect whether the sensors are communicating with the processor 310 to repeat the loop as seen in FIG. 33.

If the processor 310 determines that the kill switch 340 should be engaged based on outputs from the predetermined algorithm, the processor 310 engages the kill switch. The processor 310 then detects whether an enable switch 341 is pressed. The enable switch 341 may be a foot pedal or button 341. If the enable switch is pressed, the kill switch 340 remains engaged and the alarm continues to project sound. If the enable switch 341 is not pressed, the processor 310 proceeds to detect whether the sensors are communicating with the processor 310 to repeat the loop as seen in FIG. 33.

The enable switch 341 is configured to turn the CAD 300 on or off through an "on" and "off" position of the enable switch respectively. The CAD 300 is configured such that if the enable switch is held or pressed and the kill switch 340 is in an "on" position, the alert device 326 will sound to remind the operator that the kill switch 340 is still on. The alert device 326 may sound 3 times. The "on" position of the kill switch 340 is after the kill switch 340 has been actuated and is stopping operation of the drive mechanism or not moving the support. When the CAD 300 is "on", the CAD 300 is configured to detect movement of the operator and perform other functions mentioned in this specification. When the CAD 300 is "off", the CAD 300 is configured not to detect movement of the operator.

The enable switch 341 may be a button, switch, touch-screen or voice input.

The CAD further includes an override mode. The override mode is activated with the enable switch 341. The override mode is activated by pressing the enable switch 341 sequentially two times and then holding the enable switch 341 down on a third press for a time period. The CAD is adapted to turn off the override mode in 15 seconds after activating the override mode. After the override mode has been turned off or expired, the override mode cannot be turned on again for 60 seconds. The override mode, when activated, temporarily enables movement of the BWP for the 15 seconds.

FIG. 34 shows a simplified schematic diagram of circuitry of the CAD. FIG. 34 shows that the motion detector 320, kill switch 340, enable switch 341, joystick 22, elevate switches 330*a,b* and alert device 326 all communicate with the processor 310. FIG. 34 also shows that the processor 310 and sensors 320 are powered by a battery 342.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, terms such as "apparatus", "means", "device" and "member" may refer to singular or plural items and are terms intended to refer to a set of properties, functions or characteristics performed by one or more items or components having one or more parts. It is envisaged that where an "apparatus", "means", "device" or "member" or similar term is described as being a unitary object, then a functionally equivalent object having multiple components is considered to fall within the scope of the term, and similarly, where an "apparatus", "assembly", "means", "device" or "member" is described as having multiple components, a functionally equivalent but unitary object is also considered to fall within the scope of the term, unless the contrary is expressly stated or the context requires otherwise. In the present specification, the phrase "and/or" refers to severally or any combination of the features. For example, the phrase "feature 1, feature 2 and/or feature 3" includes within its scope any one of the following combinations: Feature 1 or feature 2 or feature 3; feature 1 and feature 2 or feature 3; feature 1 or feature 2 and feature 3; feature 1 and feature 2 and feature 3.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the manual lever 22 and railing 52 uppermost.

It will be appreciated by those skilled in the art that many modifications and variations may be made to the methods of the invention described herein without departing from the spirit and scope of the invention.

The invention claimed is:

1. A crush avoidance device for attachment to an elevated work platform (EWP), the EWP including:
- (a) a machine control system (MCS) adapted to be operated by an operator;
- (b) an operator support, the position of which is adapted to be controlled by the MCS on or in the support; and
- (c) a drive mechanism adapted to effect movement of the operator support and to immediately react to a safety response, wherein the crush avoidance device:
- (i) includes a motion detector that is adapted to detect the operator's movement in or on the support without physical contact with the operator; and
- (ii) on detecting a movement of the operator that is associated with a crush event or anticipation of a crush event, the crush avoidance device is adapted to enact the safety response, wherein the crush event or anticipation of the crush event is characterized by a sudden acceleration of the operator's torso.

2. The crush avoidance device as claimed in claim 1, further including a processor that is adapted to:
- (a) sense that an operator is present on or in the support;
- (b) identify at least one anatomical parameter of the operator; and
- (c) detect at least one characterizing movement of the operator that is associated with preparatory to, or predictive of, a crush event.

3. The crush avoidance device as claimed in claim 2, wherein the processor includes an algorithm to perform steps (a) to (c) in claim 2, and a further algorithm to map the simple dimensions and shape of the support on or within which the operator is intended to be confined during the operation of the EWP.

4. The crush avoidance device as claimed in claim 2, wherein the motion detector uses LIDAR (Light Detection and Ranging) technology to map the size, dimensions, profile and/or body shape of the operator and to feed such data to the crush avoidance device processor as variables.

5. The crush avoidance device as claimed in claim 4, wherein the crush avoidance device further includes a support motion detector configured to measure amplitude, direction of acceleration, velocity and/or position of the operator support using a "nine degrees of freedom inertial motion unit" (9DOF).

6. The crush avoidance device as claimed in claim 4, wherein the processor uses motion detection data to determine whether or not the operator is operating within a safe positional envelope (operator safety envelope) using the following criteria:

(a) the operator is no further than 200 mm from where the operator was when the dead man switch was activated by the operator; and (b) the velocity of any motion by the operator is lower than a safety threshold.

7. The crush avoidance device as claimed in claim 5, wherein the 9DOF includes an accelerometer, gyroscope and/or magnetometer.

8. The crush avoidance device as claimed in claim 5, wherein the 9DOF includes 3 accelerometers, 3 gyroscopes and 3 magnetometers configured to measure the amplitude and direction of acceleration, velocity and/or position of the support.

9. A method of avoiding a crush hazard using the avoidance device as claimed in claim 5, wherein the safety response involves immediately redirecting the movement of the drive mechanism or the movement of the supporting vehicle and further involves the actuation of a kill switch capable of immediately stopping the operation of the drive mechanism.

10. The crush avoidance device as claimed in claim 9, wherein the EWP is mounted to a vehicle and the actuation of the kill switch is adapted to disengage the EWP and vehicle drives or to switch off associated motors, to immediately halt both the operation of the drive mechanism and the motion of the vehicle.

11. The crush avoidance device as claimed in claim 10, wherein the kill switch is an electronic circuit breaker that electronically stops the operation of drive mechanism to freeze movement of the support and stop land-based movement of the vehicle.

12. The crush avoidance device as claimed in claim 10, wherein the drive mechanism includes a drive switch, the EWP includes an elevate switch, and the processor further receives digital inputs from the drive and elevate switches and analogue inputs from a joystick (hand lever) for estimating or determining acceleration, velocity and change in position of the EWP, whereby the processor is configured to estimate or calculate the acceleration, velocity and change in position of the EWP from the digital and analogue inputs and the 9DOF.

13. The crush avoidance device as claimed in claim 9, wherein the support has a cage to support the operator, and the processor is configured to use measurements from the 9DOF and the LIDAR to detect a potential crush event where it involves the support moving backward and the operator rapidly moving a certain distance and/or acceleration forward in a pattern characterizing movement preparatory to a crush event of the operator against a front rail of the cage.

14. The crush avoidance device as claimed in claim 13, wherein the current position of the operator is measured via the LIDAR motion detector and the current spatial position of the EWP is measured by the 9DOF to provide an initial starting or base-line condition, and an IMU (Inertia Measurement Unit) provides cost-effective spatial positioning information using a triad of accelerometers and gyroscopes in the form of the 9DOF.

15. The crush avoidance device as claimed in claim 1, further adapted to predict or detect a crush event characterized by:

sudden acceleration of the operator's torso toward a side or end of the operator support; or movement of the operator out of a defined normal workspace with respect to a motion detector mounting point; or acceleration of the operator outside predetermined expected parameters; or the operator moving to a position relative to the motion sensor that is lower than a predetermined height parameter.

16. A method of avoiding a crush hazard using the crush avoidance device as claimed in claim 1 involving the detection of at least one input to the MCS by the operator to estimate or calculate the amplitude and direction of acceleration, velocity and/or position of the support.

17. The crush avoidance device as claimed in claim 1, further including an alert device and an enable switch that is configured to turn the crush avoidance device on or off through an "on" and "off" position of the enable switch respectively, wherein, if the enable switch is held in the "on" position and the kill switch is in an "on" position, the alert device is adapted to sound to remind the operator that the kill switch is still on.

18. The crush avoidance device as claimed in claim 17, wherein the alert device projects voice outputs.

19. The crush avoidance device as claimed in claim 1, further including an override mode adapted to be activated with the enable switch by pressing the enable switch multiple times.

* * * * *